Figure 3:
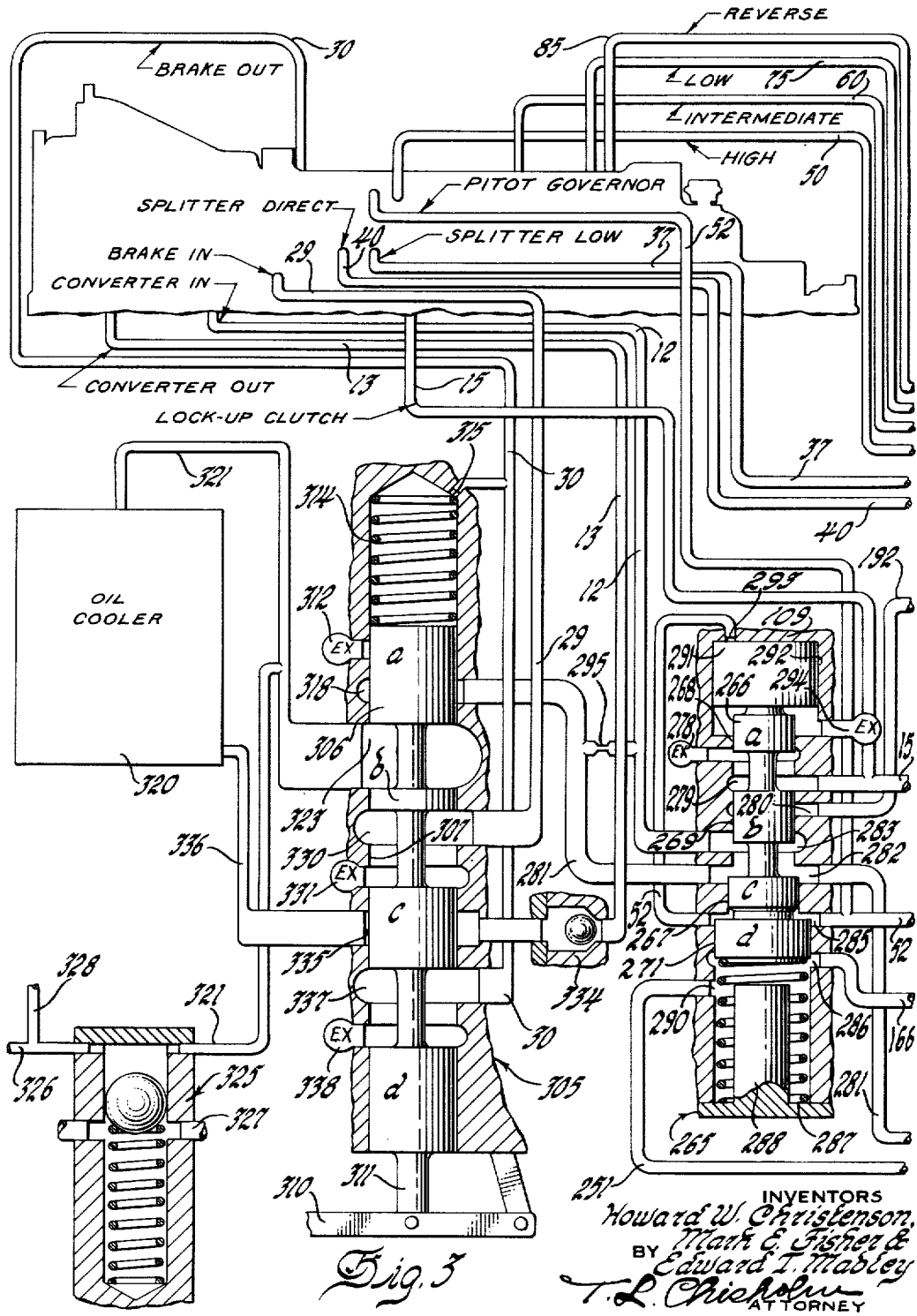

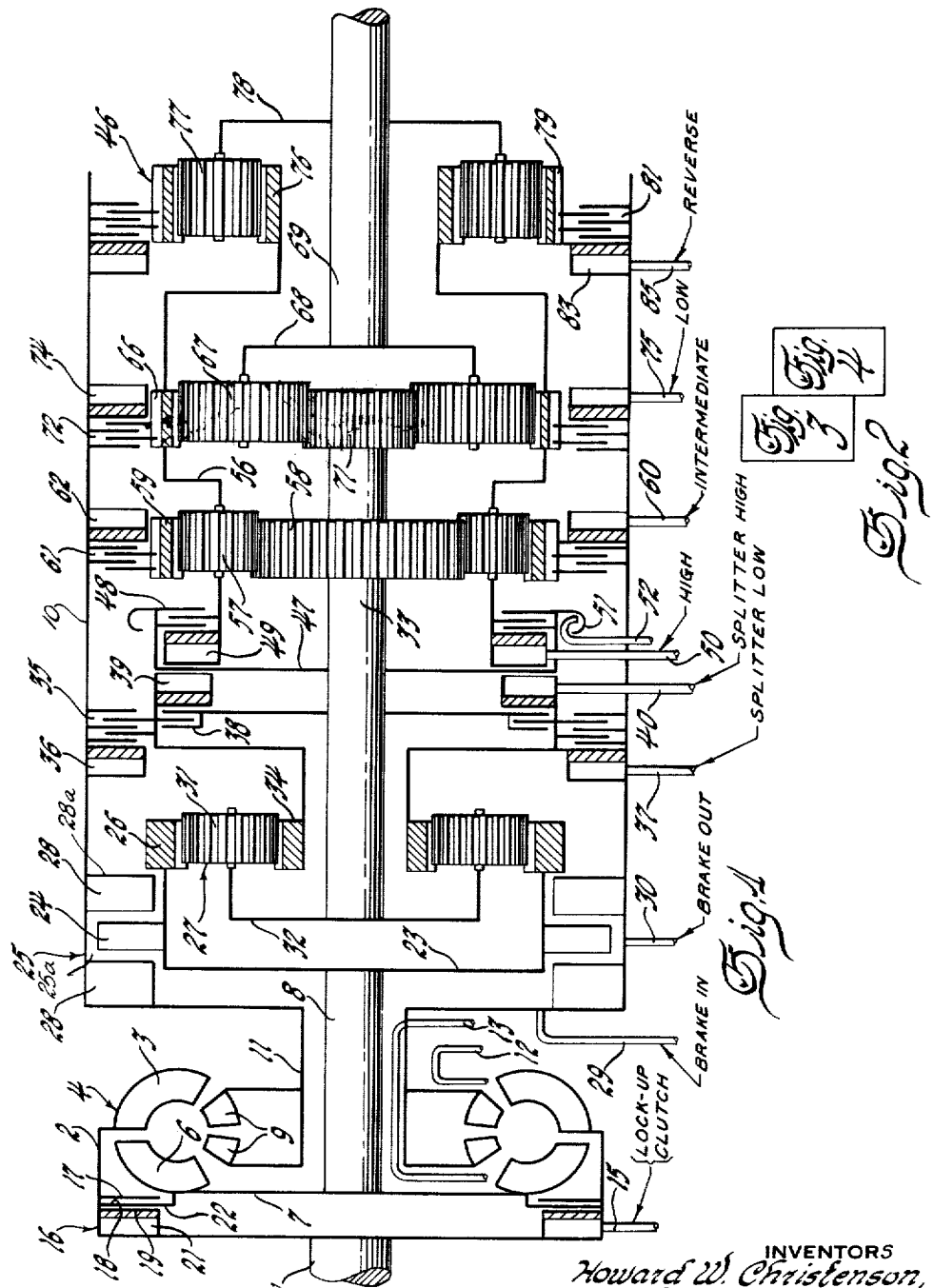

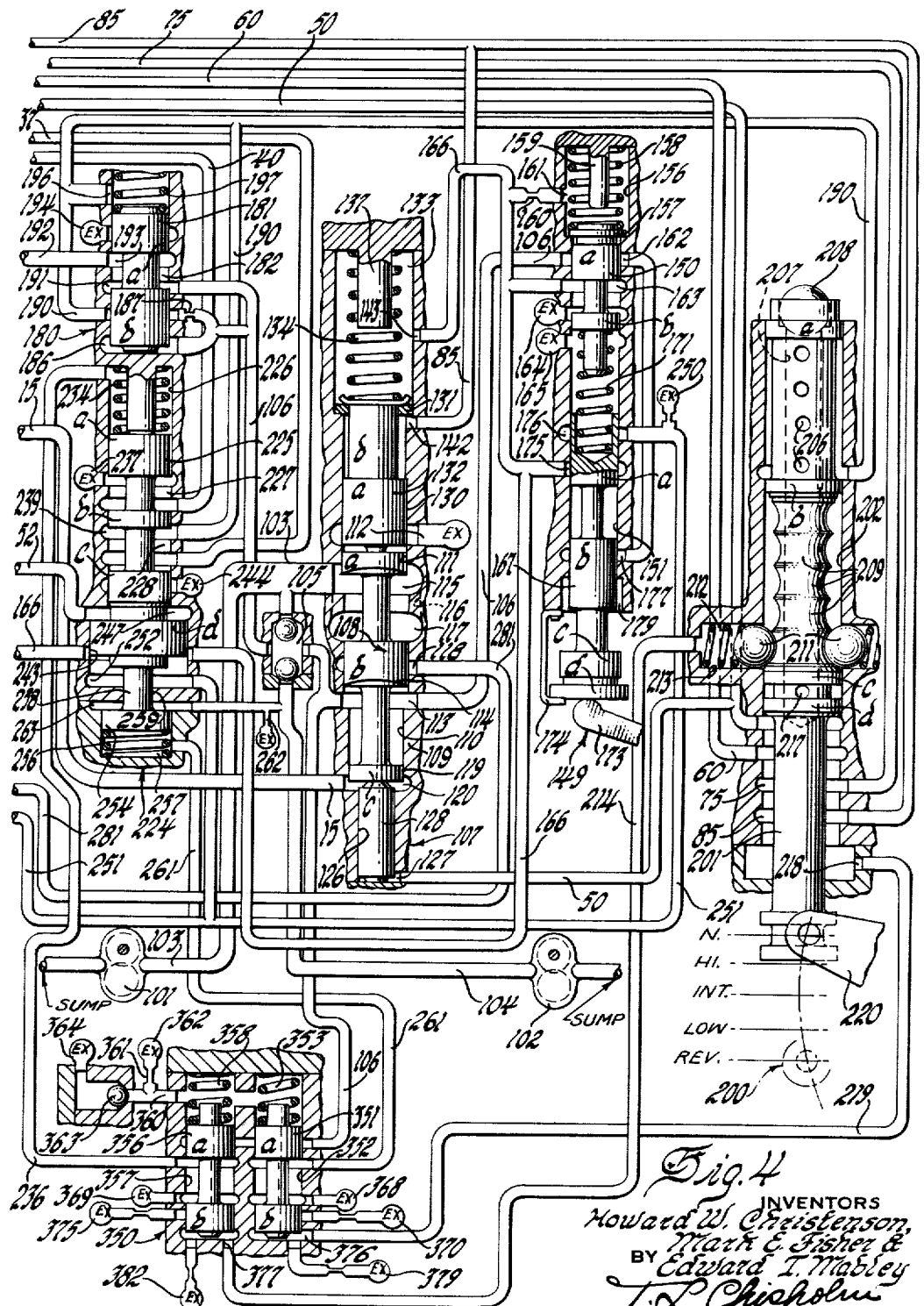

3,096,666
Patented July 9, 1963

3,096,666
TRANSMISSION
Howard W. Christenson, Indianapolis, Mark E. Fisher, Carmel, and Edward T. Mabley, Indianapolis, Ind., assignors to General Motors Corporation, Detroit, Mich., a corporation of Delaware
Filed Dec. 22, 1955, Ser. No. 554,720
42 Claims. (Cl. 74—645)

This invention relates to a multiratio transmission having a combined manual and automatic control system for varying the ratio of the transmission during operation of the vehicle.

This transmission employs in combination a torque converter, a lockup clutch and a multiratio transmission mechanism. This transmission arrangement and the control mechanism is particularly suitable for heavy-duty operation and particularly heavy-duty trucks. The engine is connected by the hydrokinetic torque converter when the torque multiplication of the converter is desirable and through the lockup clutch when it is no longer necessary to provide the additional torque multiplication of the converter to drive the multiratio transmission mechanism. This transmission mechanism which provides the six forward speed ratios and reverse consists of a planetary splitter gear unit providing underdrive and direct drive and a planetary three speed unit providing high, intermediate and low and reverse ratios. When the three speed unit is in low ratio and the splitter gear unit is in underdrive, the transmission is in first ratio. Then a shift of the splitter gear unit to direct drive with the three speed unit remaining in low will provide second ratio. When the three speed unit is in intermediate ratio, the transmission will provide third ratio when the splitter gear unit is in underdrive and fourth ratio when the splitter gear unit is in direct. When the three speed unit is in high or direct drive, the transmission will provide fifth ratio when the splitter gear unit is in underdrive and sixth ratio or direct drive when both the units are in direct drive.

The hydraulic control system for this transmission employs a manual selector valve movable from neutral to high, intermediate, low ranges and reverse. In each of these control ranges the three speed unit is hydraulically actuated to provide the high, intermediate, low and reverse drives, respectively. The splitter gear unit is automatically controlled by a splitter shift valve which is responsive to throttle force, governor force, rear pump oil and downshift and upshift controls actuated by the three speed unit. Since the splitter shift valve is normally retained in the underdrive position by a spring, the vehicle will start in the first ratio if the manual selector valve is in low range, in the third ratio if the manual selector valve is in intermediate range, and in the fifth ratio if the manual selector valve is in high range. When the vehicle begins to move the rear pump supplies oil under pressure to condition the splitter shift valve for a shift to splitter direct drive. When the governor force acting to upshift the splitter shift valve and the throttle force acting to downshift the valve reach the shift point, the splitter shift valve will upshift to place the splitter gear unit in direct drive which will change the transmission ratio, when in low range, from first to second ratio, and in intermediate range from third to fourth ratio, and in high range from fifth to sixth ratio.

The lockup clutch is disengaged by the lockup clutch valve, so the vehicle starts in converter drive. However when the vehicle is accelerated in the low ratio of the range selected, the governor and throttle forces act on the lockup shift valve to upshift the valve to engage the lockup clutch to provide direct drive which disables the torque converter. At the same time, the lockup shift valve restricts the flow of oil through the converter. The lockup clutch is also disengaged whenever a ratio change is being made by a lockup cutoff valve which is responsive to the flow of oil to the ratio servo motor being engaged to interrupt the supply of oil to the lockup clutch.

When the transmission is manually shifted from one range to another, the upshift and downshift control valves control the splitter shift valve to provide the least change in ratio. For example, in shifting from low to intermediate range, the manual selector valve will shift the three speed transmission unit from low to intermediate ratio and at the same time actuate the splitter control valve to insure that this valve is in underdrive which will result in a second to third ratio or a first to third ratio shift and prevent a shift from first or second to fourth ratio.

The transmission also incorporates a churn brake which employs oil from the torque converter supply to fill the hydrodynamic brake chamber to provide braking action. The oil from the hydrodynamic brake and from the torque converter is discharged through the oil cooler before being returned directly to the brake when the brake is applied and to the system sump when the brake is released.

An object of the invention is to provide in a multiratio transmission having a two speed gear unit and a multiratio gear unit, a manual control for changing the ratio in the multiratio gear unit and an automatic control for changing the ratio in the splitter gear unit.

Another object of the invention is to provide in a transmission having a two ratio gear unit and a multiratio gear unit a control system employing a manual control for effecting ratio changes in the multiratio gear unit and automatic vehicle condition responsive control mechanism for effecting ratio changes in the two speed unit and over control mechanism responsive to changes in the multiratio unit for effecting a change in the two speed unit to provide the proper sequence of ratio changes in the transmission.

Another object of the invention is to provide in a transmission having a torque converter and a hydrodynamic brake a common control system for supplying fluid to the torque converter and hydrodynamic brake and circulating through a common oil cooler.

Another object of the invention is to provide in a controlled multiratio transmission having a torque converter and a hydrodynamic brake, a fluid supply for the torque converter, and a control system for connecting the fluid supply and the torque converter outlet to supply the hydrodynamic brake by drawing some fluid from the converter.

Another object of the invention is to provide a hydrodynamic brake control wherein the control member offers a resistance proportional to the hydrodynamic braking effect.

Another object of the invention is to provide in an automatic controlled multiratio transmission having a torque converter and a multiratio gear unit, a hydrodynamic brake connected to a shaft between the converter and gear unit to operate at higher speeds at lower speed ratios and a control to hold the transmission at lower speed ratios.

Another object of the invention is to provide in a transmission having a torque converter and a hydrodynamic brake a control system which applies the brake by connecting the converter fluid supply and the cooler outlet into the brake inlet in order to provide a large capacity brake supply and connecting the converter and brake outlets to the cooler.

Another object of the invention is to provide in an automatic transmission a hydraulic control system employing a shift valve which is upshifted by governor force assisted by a spring and downshifted by throttle force.

Another object of the invention is to provide in a multiratio transmission a shift valve which is controlled by forces proportional to vehicle conditions and normally maintained in the downshift position by a spring which is disengaged from the shift valve in response to vehicle movement to condition the valve for movement in response to vehicle conditions.

Another object of the invention is to provide in a multiratio transmission having a control providing a plurality of ranges and a plurality of ratios in each range, a manual control for effecting a change in range and an automatic control responsive to a change in range effective to simultaneously control said multiratio transmission to insure a proper overall ratio change in the transmission to the nearest ratio in the new range.

Another object of the invention is to provide in a multiratio transmission having two multiratio units, a manual control for effecting a ratio change in one unit and an automatic control responsive to the ratio change effected by the manual control to simultaneously control the ratio change in the other unit to insure a proper overall ratio change in the transmission.

These and other objects of the invention will be more fully apparent from the following description and drawings of the preferred embodiment in which:

FIG. 1 is a diagrammatic showing of the lockup clutch and torque converter, hydrodynamic brake and multiratio gearing of the transmission assembly.

FIGS. 3 and 4 when arranged in accordance with the showing in FIG. 2 constitute the drawings of the hydraulic control system.

Transmission Gearing

The transmission drive gearing is illustrated digrammatically in FIG. 1, where the engine shaft is connected to drive the rotary torque converter housing 2 which carries the pump or impeller blades 3 of the torque converter 4. The torque converter pump hydrokinetically drives the converter turbine 6 which is mounted by disc 7 on the converter output shaft 8. The torque converter 4 also has two stators 9 which may be mounted by suitable one-way brakes (not shown) on the ground sleeve 11 fixed to the transmission housing 10. The converter input line 12 and output line 13 are also diagrammatically shown. The input shaft 1 is also connected to the converter output shaft 8 by the direct drive or lockup clutch 16 applied by lockup line 15. The direct drive clutch 16 consists of a fixed plate 17 mounted on the rotary housing 2 and a movable plate 18 formed as a face of the annular piston 19 located in the cylinder 21. The driven plate 22 is located between the fixed plate 17 and the movable plate 18. When fluid is applied through the lockup clutch line 15 to the servo motor consisting of piston 19 and cylinder 21, the driven clutch plate 22 is engaged between the movable plate 18 and fixed plate 17 to engage the direct drive clutch 16.

The converter output shaft 8 is connected by disc 23 to drive the rotary vanes 24 of hydrodynamic brake 25 and the input ring gear 26 of splitter gear unit 27. The rotary vanes 24 of hydrodynamic brake 25 are located between two rows of fixed vanes 28 mounted at each side of the rotary vanes within the brake chamber 25a formed by the walls of transmission housing 10 and wall 28a. fluid is supplied to the hydrodynamic brake chamber by inlet line 29 which is connected to the center of the brake and removed from the brake by the outlet line 30 which is connected at the perimeter of the brake chamber. Structural details of a brake of this well-known type are shown in Christenson 2,827,989.

The converter output shaft 8 also drives the input ring gear 26 of the splitter gear unit 27 which meshes with planetary pinions 31 which are mounted on a carrier 32 secured to the connecting shaft 33. The planetary splitter gear unit 27 is controlled by the sun gear 34 which meshes with the planetary pinions 31. In order to provide low or underdrive, the sun gear 34 is held by the friction engaging device 35 when actuated by servo motor 36 which, like all the servo motors in this transmission, consists of an annular piston and cylinder. The servo motors or the associated clutches for each ratio have conventional reaction springs (not shown). The servo motor 36 is actuated by fluid supplied by the splitter underdrive line 37. The planetary splitter unit 27 is placed in high or direct drive by engaging the clutch 38 which fixes the sun gear 34 to the connecting shaft 33. The clutch 38 is engaged by the servo motor 39 when fluid is supplied by the splitter direct line 40.

The splitter gear unit 27 is connected by the connecting shaft 33 to the three speed and reverse planetary gear unit 46. The connecting shaft 33 is connected by driving element 47 to the high clutch 48 which is actuated by the high servo motor 49 supplied by the high clutch line 50.

A pitot tube governor 51 is mounted on driving element 47 and the housing to supply fluid in line 52 at a pressure proportional to the speed of the splitter gear output or connecting shaft 33 for the control system. The high clutch 48 rotates with element 47 and connects the driving element 47 to the carrier assembly 56. The carrier assembly carries the intermediate planetary pinions 57 which mesh with the intermediate sun gear 58 fixed to shaft 33 and intermediate ring gear 59. To provide intermediate ratio, the intermediate ring gear 59 is stopped by friction engaging device 61 when actuated by the intermediate servo motor 62 under the control of fluid supplied by intermediate line 60. The carrier assembly 56 also includes the low ring gear 66 which meshes with the planetary gears 67 mounted on carrier 68 fixed to output shaft 69. The low sun gear 71 meshes with planetary pinions 67. Low is provided by stopping the ring gear 66 and incidently the carrier assembly 56, by means of the low friction engaging device 72 which is actuated by the servo 74 when pressure is supplied by the low line 75.

The carrier assembly 56 also includes the reverse sun gear 76 which meshes with the reverse pinions 77 fixed by carrier 78 to output shaft 69. The reverse ring gear 79 is held stationary in reverse by friction engaging device 81 when engaged by servo motor 83 on the supply of fluid by the reverse line 85.

Transmission Gearing Operation

This gearing arrangement provides six forward speed ratios and reverse by combining the two speed ratios of the two speed or splitter gear unit 27 and the three ratios and reverse of the three speed and reverse unit 46. The splitter gear unit 27 has an input ring gear driven by the torque converter 4. When friction engaging device 35 is engaged to stop sun gear 34, the output pinions 31 and shaft 33 are driven at a reduced speed or underdrive ratio. When clutch 38 locks sun 34 to connecting shaft 33, the splitter gear is locked up to provide a 1:1 ratio or direct drive. The three speed unit provides low ratio when the low friction engaging device 72 is engaged to hold low reaction ring gear 66 so that the input sun gear 71 drives pinions 67 and output shaft 69 at a reduced speed for low ratio. When intermediate friction engaging device 61 is engaged, the three speed unit functions as a dual planetary gear. The intermediate reaction ring gear is held and the input sun gear 58 drives carrier 56 which rotates low ring gear 66 to drive, in conjunction with input sun gear 71, the output pinions 67 and shaft 69 at an intermediate ratio. High ratio is provided by engaging the high clutch 48 to lock the carrier 56 to connecting shaft 33 to lock up the three speed unit for direct drive or high ratio. Each of the six ratios is provided by engaging one friction engaging device in the splitter gear unit 27 and one friction engaging device in the three speed unit and disengaging the other friction engaging device. When the low friction engaging device 72 is engaged to provide low ratio in the three speed unit 46, the transmission may be placed in either first ratio by placing the splitter gear unit 27 in underdrive by engaging friction engaging device 35 or in second ratio by placing splitter gear unit 27 in direct drive by engaging the clutch 38. When the three speed unit 46 is placed in intermediate drive by engaging friction engaging device 61, the transmission may similarly be placed in third and fourth ratios by again engaging the underdrive or the direct drive respectively of the splitter gear unit 27. When the transmission is shifted to high ratio in the three speed unit 46, the transmission may be placed in fifth ratio by shifting the splitter gear unit to underdrive and sixth ratio by shifting the splitter gear unit to direct drive.

Hydraulic Control System Regulator Unit

The fluid supply for the hydraulic control system consists of a front or engine driven pump 101 and the rear or output shaft driven pump 102 which supply fluid from the sump through line 103 and line 104, respectively, to the dual check valve 105 to the main line 106 of the hydraulic control system. When the engine is started, the high capacity front pump supplies fluid, usually oil, via lines 103 and 106 to the regulator valve unit 107. The regulator valve 108 having lands a and b of equal diameter and smaller land c is located in the valve body 109. The valve body 109 has a bore 110 having several stepped diameters for the regulator valve 108 and actuating plugs. The large portion 111 of bore fits lands a and b and is located between the exhaust port 112 and the main line or inlet port 113 for the main line 106. The bore portion 111 has between exhaust port 112 and the main line port 113, a front pump port 115 and a secondary front pump port 117 which are hydraulically interconnected by axial grooves 116 and a converter and brake supply port 118. The valve bore on the lower side of the main line port 113 has a portion 119 of smaller diameter fitting land 108c which extends to the lockup clutch line port 120. The regulator valve 108 in the closed position shown has the large diameter land 108a located in the bore 111 between front pump port 115 and exhaust port 112, the large diameter intermediate land 108b covering supply port 118 and positioned between secondary front pump port 117 and main line port 113, and a small land 108c located at the other end of the valve in the bore 119 above the lockup clutch port 120. Below the port 120 the regulator valve body 109 has a bore 126 of smaller diameter than bore 119 which terminates at the high clutch line port 127. The high clutch regulator plug 128 positioned in the bore 126 is acted upon by the high clutch pressure to reduce the main line pressure as described under regulator valve operation. The regulator valve bore 110 has a bore portion 130 smaller than bore portion 111 beginning at the exhaust port 112 extending from valve 108 to the seal 131. The stepped throttle and reverse regulator plug 132 is positioned in the bore 130 with land a fitting the bore above exhaust port 112 and reduced portion b fitting seal 131 fixed in bore 130. The bore 130 is enlarged above seal 131 to provide a spring chamber 133 for the spring 134 positioned between the upper end of the regulator plug 132 and the upper end of chamber 133. A stem 137 fixed to the upper end of the spring chamber guides spring 134 and limits upward movement of valve 108. In order to permit the valve and the regulator plug to be assembled the bore 130 is provided by a sleeve insert and seal 131 is removable. The reverse port 142 is located between exhaust port 112 and seal 131 adjacent the seal and supplies oil to bore 130 to act on the shoulder or unbalanced area of the regulator plug 132 at the point between the large diameter portion a and the small diameter portion b. The throttle valve pressure entering chamber 133 of bore 130 through the port 143 acts on the free end of the regulator plug 132.

Regulator Valve Operation

The oil pressure in the main line 106 is controlled by the regulator valve unit 107. When oil is supplied by either the front pump 101 or rear pump 102 through the dual check valve 105 to the line 106, the oil enters the space between the unbalanced lands b and c of valve 108 and urges the valve up compressing spring 134. The spring initially controls the pressure in main line 106. When the line 106 is filled, the pressure will rise and lift valve 108 to exhaust the excess oil to the converter and brake feed line 281. When these units are fully supplied with oil, a further increase in pressure will lift the valve 108 to directly connect the front pump via line 103 between the lands 108a and b to exhaust 112 to directly exhaust the front pump. If the rear pump 102 supplies an excess of oil the valve 108 will rise until the land b is centrally located in the large port 115, 117 so that the oil from the rear pump 102 may pass around land b and through the valve bore 109 to exhaust 112. Though the basic main line pressure is regulated by balancing the line pressure force on the unbalanced area of lands 108b and c against spring 134, the spring force is modified by other pressures to, at times, modify the main line pressure. The main line pressure is reduced when the lockup clutch is engaged, since the lockup oil in line 15 acts at port 120 on the free end face of the land 108c. The main line pressure is reduced to a lesser degree when the three speed unit of the transmission is in high ratio by the oil in high clutch line 50 and port 127 acting on the lower face of the plug 128 which has a smaller area than land 108c. The plug 128 will reduce the main line pressure when the three speed unit is in high ratio if the lockup clutch is not engaged. When the lockup clutch is engaged, the lockup oil acting on the plug 128 will balance the high clutch oil acting on plug 128 since both are at main line pressure rendering plug 128 ineffective. When the reverse friction engaging device is applied, the reverse oil in line 85 acts on the shoulder between the lands a and b of plug 132 to increase the line pressure. The throttle pressure connected by line 166 acts on the free end of plug 132 to increase the line pressure in accordance with the throttle pedal position. Reverse and throttle oil act independently and cumulatively to increase main line pressure. Lands 108a and b have a concave edge as at 114 to provide gradual opening for shockless control.

Throttle Regulator Valve

Before the regulator valve shifts sufficiently to supply pressure through port 118 to the converter, it will supply line pressure through line 106 to the other valves of the system including the throttle regulator valve unit 149. The regulator valve 150 having lands a and b of equal diameter is located in a bore 151. The free end of land 150a has a shoulder 157 which limits downward movement of the valve 150 by contacting a shoulder at the end of bore 151 adjacent chamber 156. Beyond the bore 151 there is a larger diameter portion providing a chamber 156 for the spring 158 which exerts a small pressure on the valve to normally position the valve 150 in the closed position when the system is not in use. A stop 159 limits upward movement of the valve 150. The spring chamber has a throttle line port 161 which supplies throttle pressure via orifice 160 to the end of the valve land 150a. When the valve 150 is closed, the main line pressure in line 106 is connected by port 162 to the valve bore 151 adjacent the end and opposite the land 150a and the throttle pressure port 163 is located below land 150a. There is an exhaust port 164 on the upper side of the land 150b and exhaust port 165 on the lower side of land 150b. When regulator valve 150 is opened by the throttle pedal as explained below, the main line 106 is connected by ports 162 and 163 between lands 150a and b to throttle pressure line 166.

The throttle valve 167 has lands a and b of equal diameter positioned in bore 151 and large land c and stop shoulder d. A spring 171 is positioned between the free ends of land b of regulator valve 150 and land a of throttle valve 167. Suitable projections or recesses may be used to locate the spring. The throttle valve 167 is actuated by a lever 173 controlled by the engine fuel feed mechanism or throttle pedal which moves the valve upwardly to exert a greater force through the spring 171 on the throttle regulator valve 150 with increasing throttle pedal position to provide increasing throttle pressure at port 163. A stop 174 cooperates with the shoulder 167d to limit movement of the throttle valve 167 in both directions. When valve 167 is in the closed position and the normal throttle range, land 167a blocks throttle line port 175 and detent port 176 and land 167b blocks port 177. In the forced downshift or detent position, the large land 167c is partially in bore 179 and the valve 167 connects throttle line 166 at port 175 between lands 167a and b to port 176 and detent line 251 and main line 106 at port 177 between lands 167b and c.

Throttle Valve Operation

When the throttle pedal linkage 173 is at the closed throttle position shown with the land 167d against the stop 174, throttle valve does not supply oil to the throttle line 166 since the land 150a blocks main line 106 at port 162. When the throttle is advanced, the linkage 173 moves the valve 167 and spring 171 is compressed moving valve 150 and compressing spring 158. The valve 150 moves and connects main line 106 and port 162 between lands 150a and b to port 163 and the throttle line 166. The throttle line 166 is connected through orifice 160 and port 161 to the free end of valve 150 to oppose the movement of valve 150 under the action of spring 171 to provide regulator valve action providing throttle oil in line 166 proportional to the throttle pedal position. The orifice 160 in line 161 prevents rapid surges of pressure in the chamber 156 and thus tends to provide a more uniform throttle pressure. Continued movement of the throttle linkage 173 to the full throttle position slightly increases the throttle pressure for forced downshifts. At this time the throttle pressure in line 166 at port 175 is connected between the lands 167a and b to port 176 which is connected to the detent line 251 which is unaffected by bleed 250 to provide forced downshifts of the splitter shift valve unit 224 and the lockup valve unit 265 at a higher speed. The orificed bleed 250 vents line 251 when valve 167 is closed. Before this connection is made, the main line pressure from the continuation of line 106 around the port 162 is admitted from port 177 to act upon the unbalanced area between lands 167b and c as just after land c enters the bore 179 to provide a hydraulic detent or feel informing the operator that detent pressure is now being supplied to the shift valves.

Lockup Cutoff Valve

Main line 106 is also connected to a lockup cutoff valve unit 180 having valve 181 located in a bore 182 in the valve body 109. Lockup valve 181 has an upper land a and a lower land b of the same diameter with an intermediate portion of reduced diameter. Main line 106 enters bore 182 at the lower end through port 186 and acts upon the lower end of valve 181. The line 106 is connected through orifice 187 to the ratio clutch line 190 which passes around the land 181b of the lockup valve but has no effect thereon. Ratio clutch line 190 is connected by the shift valve to supply all ratio servo motors. With the valve 181 in the open position shown, line 106 is connected to the port 191 at the lower edge of the portion between the lands a and b, the lockup supply line 192 is connected by the port 193 at the upper portion of the space between these valve lands to connect line 106 and line 192 to normally supply the lockup shift valve and the exhaust port 194 is blocked by land 181a. The ratio clutch line 190 is also connected by port 196 to act on the top end of valve 181. Spring 197 positioned in bore 182 normally urges the valve down to the open position shown.

Lockup Cutoff Valve Operation

The lockup cutoff valve unit 180 is normally held by spring 197 in the supply position shown connecting the main line 106 at port 191 between lands 181a and b to port 193 and the lockup supply line 192. The main line is connected at port 186 to act upon valve 181 and through an orifice 187 to the ratio clutch line 190 which extends around land b and is connected at port 196 to act down on valve 181. When a ratio change is not being made, there is only leakage flow in the ratio clutch line 190 and the main line provides an equal pressure at both ends of the valve 181 and the spring 197 holds the valve down in the open position connecting the main line 106 to the lockup supply line 192. However, when a ratio clutch is being engaged, oil flows through line 190 and there is a pressure drop across the orifice 187. The higher pressure in line 106 on the pump side of orifice 187 acts via port 186 on the lower side of valve 181 and overcomes the lower pressure in line 190 on the remote side of orifice 187 acting via port 196 on the upper side of valve 181 and the valve 181 is moved up to the closed position blocking main line 106 from lockup supply line 192 to disengage the lockup clutch 16. When the ratio change is completed, the flow ceases and the pressure at both ends of the valve 181 is equalized permitting the spring 197 to return the valve to the open position supplying oil to the lockup supply line 192 to engage the lockup clutch 16 if the lockup shift valve unit 265 is in engaged position.

Selector Valve

The ratio supply line 190 leads to the selector valve unit 200 having a manually moved valve 201 located in a uniform diameter bore 202 in valve body to select the ratios in three speed unit 46. The selector valve has an upper land 201a and an intermediate land 201b with an intermediate portion of reduced diameter having a plurality of apertures 206 connecting the outside of the valve with the dead end bore 207 which is closed at the upper end by ball plug 208 of the valve. On the other side of land 201b the valve body 201 is provided with a series of annular rounded recesses 209 for each shift position: Neutral "N," High "H," Intermediate "Int," Low "Lo," and Reverse "R." Detent balls 211 are resiliently urged into engagement with recesses 209 by springs 212 positioned in radial bores 213 in the valve body. One of the bores 213 also provides an exhaust port which is connected to downshift signal line 214. Located below the recesses 209, the valve 201 has a pair of closely spaced lands 201c and d with a portion of reduced diameter between the lands. An aperture 217 between these lands is connected to the internal bore 207 which terminates at this point to provide a connection between ratio clutch line 190 and the space between the lands c and d. Valve 201 is shown in neutral position where the flow is stopped. As the valve is moved down, space between the lands and thus line 190 is successively connected in high to the high clutch line 50, in intermediate to the intermediate friction engaging device line 60, in low to the low friction engaging device line 75 and in reverse to reverse friction engaging device line 85. The high clutch line 50 is also connected to the high clutch plug 128 of the regulator valve and the reverse line 85 is connected to the reverse regulator plug 132 of the regulator valve. At the lower end of the valve bore 202 the exhaust port 218 is connected to upshift signal line 219. The valve 201 is actuated by a manual control linkage terminating in lever 220 connected to the valve.

Selector Valve Operation

The range selector valve unit 200 is illustrated in neutral position where the ratio change supply line 190 which is connected between lands 201a and b, the bore 207 and is blocked between the lands 201c and d in valve bore 202. Movement of the valve from neutral through the high, intermediate, low and reverse positions successively connects the ratio change line 190 by means of the space between the lands 201c and d to high clutch line 50, intermediate line 60, low line 75 and reverse line 85. It will be seen that in each position of the valve the servo lines that are located below the land 201d will be connected to port 218 and upshift signal line 219 which provides an exhaust and a control signal and that the servo lines above the land c will be connected via bore 213 to the downshift signal line 214 which also provides an exhaust and control signal as explained below in connection with the splitter shift control valve unit 350.

Splitter Gear Shift Valve

The splitter shift valve unit 224 which is employed to control the two speed splitter gear unit 27 has a valve 225 having a land a of small diameter, intermediate lands b and c of equal diameter and a large control land d positioned in bore 226 in valve body 109. The bore 226 has an upper portion 227 of small diameter for land a and a lower portion 228 of intermediate diameter for lands b and c. In the upper end of the valve bore 226 a spring 234 abuts against the end of the bore and the free end of land 225a to urge the shift valve toward the underdrive or low position. The bore 226 adjacent spring 234 and above land 225a is always connected to the upshift control line 236. When the valve 225 is in the upper position shown, the exhaust port 237 is adjacent land a and connected by the space between lands a and b to the splitter high clutch line 40 located adjacent land 225b. The ratio clutch line 190 is connected to the shift valve between lands 225b and c adjacent land b and connected between the lands to the splitter low line 37 located adjacent land c. The land 225c blocks exhaust 244. The splitter shift valve bore 226 has below the intermediate diameter portion 228 a control land bore portion 243 of large diameter for the control land 225d which is integrally connected to the splitter shift valve 225. The governor line 52 from the pitot governor is connected to the port 247 on the valve side of the control land 225d. The throttle line 166 extends through bore 243 below the control land 225d. Valve 225 is controlled in its movement to shift the splitter gear set by the governor oil acting on one side and the throttle oil acting on the other side of the valve land 225d. The detent oil from port 176 of the throttle valve is fed via line 251 to the port 252 to act upon valve 225 to downshift the splitter shift valve 225.

Below the splitter shift valve 225 there is a splitter plug 254 located in a separate coaxial bore 256. A spring 257 abuts against the end of bore 256 and the free end of the plug 254 to urge the plug upward. At the upper end of the plug there is integrally attached thereto a stem 258 which extends through an opening 259 in the wall between the bores 226 and 256. The spring 257 holds the splitter shift valve 225 in the upper or underdrive position when the vehicle is stopped and until overcome by rear pump pressure connected by line 104 at port 263 to act down on plug 254. Downshift control line 261 is connected to spring chamber 256 to act upon plug 254 to downshift valve 225.

Splitter Shift Valve Operation

The splitter shift valve unit 224 controls the operation of splitter gear unit 27 and directs oil at main line pressure from the ratio supply line 190 to either the underdrive line 37 or the direct drive clutch line 40 to control the splitter gear unit 27. In the downshift position shown, the vehicle is at rest and the spring 257 acting through plug 254 overcomes spring 234 and holds the valve 225 up in the underdrive position connecting line 190 between lands 225b and c to the underdrive line 37 and connecting the direct drive clutch line 40 between the lands 225a and b to the exhaust 237. With the vehicle at rest, rear pump line 104 is vented by orifice 262. As the vehicle begins to move the rear pump pressure in line 104 increases in proportion to vehicle speed due to orifice 262 and acts on the plug 254 to move plug 254 away from valve 225 and compress spring 257 permitting the valve 225 to move under the influence of the other controls. Then as the governor pressure in line 52 and spring 234 acts downwardly on the land 225d and the throttle pressure in line 166 acts upwardly on the land 225d, the valve will move down or upshift when the governor and spring forces overcome the throttle force. When the valve 225 is upshifted, ratio clutch line 190 is connected between unbalanced lands 225a and b to the direct drive clutch line 40 and the underdrive line 37 is connected between lands 225b and c to exhaust 244. Since Pitot governors generate a low pressure at low vehicle speeds, the governor pressure and the valve spring 234 act in the same direction on valve 225 in opposition to the throttle pressure. The unbalanced lands provide a spread between the upshift and downshift points. Valve 225 may also be upshifted by oil in upshift control line 236 which is connected to spring chamber 226 and downshifted by oil in control line 261 connected to spring chamber 256 as explained below in connection with the splitter shift control valves 350. Since the Pitot governor 51 provides a low pressure, the splitter shift valve spring 234 acts in the same direction as the governor oil. Since the spring 234 would hold valve 225 in direct drive when the vehicle is at rest and before the throttle is depressed, the spring 257 is employed to hold valve 225 in downshift position until the vehicle starts moving and the rear pump oil disengages plug 254 and spring 257 from valve 225 to condition the valve for an upshift. At this time the throttle pressure is sufficient to hold valve 225 in the downshift position. Then as engine and vehicle speed increase, governor oil and spring 234 upshift the valve 225 against the throttle oil. The detent oil may downshift the valve 225 by overcoming the governor oil, spring 234 and main line oil acting on the unbalanced lands 225a and b. Throttle oil does not act to downshift valve 225 since throttle line 166 is blocked from bore 243 by land 225d and the lockup valve is upshifted disconnecting the throttle lline 166 and detent line 251 at this valve.

Lockup Shift Valve

The lockup shift valve unit 265 (FIG. 3) for engaging lockup clutch 16 has a valve 266 having a small land a, lands b and c of intermediate diameter and a large land d located in the bore 267 in the valve body 109. The bore 267 has an upper portion 268 of small diameter fitting land a, a central portion of intermediate diameter 269 fitting lands b and c and a lower end portion 271 of large diameter fitting land d. With the lockup shift valve 225 in the closed position shown, the exhaust port 278 is at the lower edge of land a and centrally located in the small diameter bore portion 268. Between the small bore portion 268 and the intermediate bore portion 269 and at the upper edge of land b there is a port 279 connected to the lockup clutch line 15. It will be noted that line 15 is connected to port 120 of the regulator valve 108 to reduce the main line pressure when the lockup clutch is engaged. The lockup supply line 192 originating at port 193 of the lockup clutch cutoff valve unit 180 is connected to port 280 located in the central bore portion 269 which is blocked by land 266b when the valve is in the closed position. The converter and brake feed line 281 originating at port 118 of the regulator valve unit 107 connects with port 282 adjacent land 266c communicating with the space between lands 266b and c. Immediately above port 282 and between the lands 266b and c is the converter feed port 283 for the converter inlet line 12. Between the central bore 267 and the large diameter bore 271 of the lockup shift valve, there is a governor pressure port 285 located between lands 266c and d. Throttle pressure port 286 located at the free end of the control land 266d when valve 266 is in the closed or disengaged position. The lower end of the lockup shift valve bore portion 271 is closed. The spring 287 which abuts the end of the bore 271 and the free end of the control land 266d continuously urges the valve upwardly to disengage the lockup clutch. Stop 288 limits downward movement of the valve. The detent line 251, which originates at port 176 of the throttle valve unit 149, is connected by the port 290 to the space in the bore 271 always beyond the free end of the control land 266d.

In order to provide an increased area for the Pitot governor oil acting on valve 266, a plug 291 having a large diameter is positioned in the large bore portion 292 at the upper end of the lockup shift valve 266. The governor pressure line 52 is connected through annular port 285 to port 293 to act upon the end of the plug 291 which engages the end of the valve 266. Exhaust port 294 is located between the plug 291 and the end of the shift valve 266.

*The Lockup Shift Valve Operation*

The lockup shift valve unit 265 controls the lockup clutch and converter inlet line 12. The lockup shift valve 266 is normally held in the upper or closed position by the spring 287 where the lockup supply line 192 is blocked by the land 266b, the lockup clutch line 15 is connected between the lands 266a and b to exhaust port 278 and the brake converter feed line 281 is connected between the lands 266b and c to the converter inlet line 12 and a continuation of converter and brake feed line 281. The converter and brake feed line 281 which is always connected through the valve bore 267 between the lands b and c to the continued portion of the converter and brake feed line 281. The valve is controlled by governor and throttle oil to provide a shift to the open or engaged position. Since the Pitot governor oil has a low pressure, it is connected to two areas to provide the force required. The governor oil in line 52 is connected to port 285 to act upon unbalanced area between the lands 266c and d and is connected by the annular port 285, line 52 and port 293 to the opposite and of the valve to act on the plug 291 to move the valve 266 to the engaged position, depressing spring 287. The throttle pressure acting in line 166 which is continually connected through the annular port in bore 243 in valve 224 is connected at port 286 to the bore 271 where it acts upon the free end face of land d to assist the spring resisting the governor force acting on the valve. Thus when the governor force increases sufficiently to overcome the spring, and the throttle forces, the valve will move down to the open or engaged position where if the lockup cutoff valve unit 180 is supplying oil to the lockup supply line 192, line 192 will be connected between lands 266a and b to the lockup clutch line 15 and exhaust 278 closed to engage the lockup clutch. It will be noted that the lockup clutch line 15 is also connected to the main pressure regulator valve unit 107 and decreases line pressure when the lockup clutch is engaged. The increase will be large except in high where the line pressure has already been partially decreased by high clutch oil acting on plug 128. The downward movement of the valve 266 in engaging the lockup clutch also blocks the converter inlet line 12 at port 283 with land b to block free flow to the converter. However the converter is fed at a slower rate from the converter and brake feed line 281 which is connected between lands 266b and c to the continuation thereof through orifice 295 to the converter inlet line 12. In the open position land d blocks throttle line 166 so throttle oil will not act to close the valve. Thus the valve will not close except at a substantially lower vehicle speed. When the throttle is in detent position, the detent oil in line 251 will enter bore 271 at port 290 and act upon the land d of valve 266 to overcome the governor force and the hysteresis of unbalanced lands a and b to disengage the lockup clutch and reinstate full flow to the converter.

*Brake Valve*

The brake valve unit 305 (FIG. 3) for engaging the hydrodynamic brake 25 has a valve 306 with lands a, b, c and d of uniform diameter located in a blind bore 307 of uniform diameter. The valve is controlled by an actuating linkage 310 connected to a stem 311 formed on the end of land 306d. The linkage has a stop mechanism (not shown) to limit movement of the valve 306 out of the bore 307 under the influence of the spring 314 which seats in the end of the bore 307. The brake outlet line 30 is connected at port 315 to the spring chamber portion of the valve bore 307 to act upon the end face of land 306a. The drain port 312 prevents a pressure build-up in the spring chamber due to leakage. The converter and brake feed line 281 is connected to port 318, which in the illustrated brake off position of valve 306, is blocked by the land a. The oil cooler 320 is connected by the cooler outlet line 321 to the port 323 located between the lands 306a and b in the brake off position. Cooler outlet line 321 is also connected to the relief valve 325 which may drain excessive oil from the lubricating lines 326 to the sump line 327. The Pitot tube governor is fed from the lubricating line 326 by line 328. The brake inlet line 29 is connected to brake valve 306 at port 330 which in the brake off position is between lands b and c adjacent land b. An exhaust port 331 is located adjacent land c between lands b and c. Converter outlet line 13 is connected through a one-way check valve 334 and through the annular port 335 which extends around the land c with the valve in brake off position to the oil cooler inlet line 336. The brake out line 30 is also connected to the port 337 located between lands c and d adjacent land c while the exhaust port 338 is adjacent land d.

*Brake Control Valve Operation*

With the brake control valve unit 305 in the brake off position as shown in FIG. 3, the brake and converter feed line 281 is blocked by the land 306a. The converter inlet line 12 is supplied either through the lockup shift valve unit 265 which provides an unrestricted supply or the orifice 295 which provides a restricted supply. The brake inlet 29 is connected between the lands b and c to exhaust 331 and the brake outlet 30 is connected between the lands c and d to exhaust 338. The converter outlet line 13 is connected through check valve 334 around the land 306c to the cooler inlet line 336. The oil passes through the cooler 320 to line 321 to the lubrication line 326 and the Pitot governor line 328. Excess oil is vented by the relief valve 326 to the sump line 327.

Brake control valve 305 may be actuated by control linkage 310 to move the valve 306 further into the bore 307 against the force of spring 314 and the brake outlet pressure supplied to the end of valve 306 of land b by port 315. The brake outlet pressure in line 30 is proportional to the braking effect since, as shown, the brake outlet line is connected to the brake chamber adjacent the outer perimeter and the brake inlet line 29 is connected adjacent the inner perimeter and the volume of fluid in the chamber is proportional to the braking effect and outlet pressure. The applicants believe this relationship or proportion between brake effect or torque and brake outlet pressure is also in part due to the line friction or restriction of the lines shown connecting the brake outlet to the brake inlet since tests have shown that increased line friction will increase the proportion of brake outlet pressure to brake torque. Since the brake out pressure is proportional to the braking effect of the hydrodynamic brake, the movement of the valve is resisted by a force proportional to the braking effect. Movement of the valve 306 to the brake on position connects the converter and brake feed line 281 at port 318 between the lands 306a and b and the oil cooler outlet flow in line 321 at port 323 to flow around land b to the space between lands b and c where the combined brake supply and converter and brake outlet oil enters port 330 and the brake inlet line 29. The exhaust ports 331 and 338 are closed by the lands c and d, respectively, when the valve is in the brake on position. The converter outlet line 13 is then connected through the check valve 334 to the port 335 between the lands 306c and d where it is joined by brake out line 30 now also connected by port 337 to the space between the lands c and d and the combined brake and converter outlet oil enters the cooler inlet line 336 and flows through the cooler 320. The oil then circulates through the cooler in line 321 and is returned to brake as long as the brake control valve 305 is in the brake on position.

*Shift Control Valve*

The splitter shift control valve unit 350 shown in FIG. 4 is employed to insure single ratio shifts in a fixed sequence when the manual selector valve unit 200 is moved between the high, intermediate and low range positions.

The upshift control valve 351 has lands a and b of equal diameter and is located in a bore 352. The spring 353 holds the valve in the closed position shown. The downshift valve 356 having lands a and b of uniform diameter is located in the bore 357 and is held by the spring 358 in the closed position shown. The spring chamber portions of bores 352 and 357 are connected by line 360 through an orifice 361 to submerged exhaust 362 and through the check valve 363 to the free exhaust 364 to control the rate of movement of valves 351 and 356. Exhaust 362 is submerged below a sump oil level such as the oil level of the transmission sump so oil is drawn into the spring chamber portion of bores 352 and 357 when the valves close. The main regulated line 106 is connected to both bores 352 and 357 opposite the land 351a and 356a respectively when the valves are in closed position where this line is blocked. With the upshift valve 351 in closed position shown, the bore 352 is connected between lands 351a and b to the downshift control line 261 for splitter shift valve unit 224 adjacent the land a and exhaust 368 adjacent land b. With the downshift valve 356 in the closed position shown, the bore 357 is connected between lands 356a and b to the upshift control line 236 adjacent land a and to exhaust 369 adjacent land b. With the valves in the closed position the bore 352 has a second restricted exhaust 370 connected opposite land 351b and the bore 357 has a second restricted exhaust 375 opposite land 356b to exhaust lines 219 and 214 respectively. The upshift signal line 219 is connected to the end of bore 352 at port 376 to act on the free end face of land 351b while downshift signal line 214 is connected at port 377 to the end of bore 357 to act upon the free end face of land 356b. The end of the bore 352 is also provided with a first restricted exhaust 379 and bore 357 with a first restricted exhaust 382 to permit restricted exhaust flow through the signal lines. These restricted exhausts have an orifice to limit exhaust flow.

*Shift Control Valve Operation*

The splitter shift control valve unit 350 is employed to insure a consecutive shift of the least number of ratios when the manual control is shifted from one range to another range. When the transmission is, for example, in second ratio and the selector valve unit 200 is upshifted from low to intermediate range, the three speed unit 46 will shift from low to intermediate ratio. If the splitter gear unit 27 remains in splitter direct as it is in second ratio, the transmission may shift from second ratio to fourth ratio and then to third ratio. This would be a rough shift. During this low to intermediate range shift, this transmission would otherwise shift from second ratio to fourth ratio since the splitter shift valve unit 224 which controls splitter gear unit 27 would remain in the upshift position until the three speed unit 46 has been shifted from low to intermediate ratio to reduce the governor speed to downshift the splitter valve unit 224. In order to make certain that a one ratio shift from second to third ratio is obtained, the exhaust from the low ratio servo line 75 is employed as a signal to the splitter shift control valve unit 350 which downshifts the splitter valve unit 224 from direct drive to underdrive during the shift interval. This insures a single ratio shift from second to third ratio. If, when this shift is completed, the vehicle speed is still high enough so that the governor calls for the shift to fourth ratio, the splitter shift valve 224 will then shift to direct under the influence of the governor 51 to place the transmission in fourth ratio. If the transmission is in first ratio when the manual control is shifted from low to intermediate range, the shift control valve 350 will hold the splitter gear in underdrive, to insure a shift to the nearest ratio, third, in intermediate range. The valve unit 350 functions similarly on a shift from intermediate to high range.

The valve unit 350 also insures a downshift of the least number of ratios by upshifting the splitter gear unit to direct drive or holding the splitter gear unit in direct drive when the three speed unit 46 is downshifted from a higher to a lower range. Then the splitter gear will be shifted to or held in direct drive to eliminate all unnecessary jump shifts to a lower ratio in the lower range.

The splitter shift control valve unit 350 has an upshift valve 351 and downshift valve 356. The main line 106 is always connected to both valves and is normally blocked by lands 351a and 356a. When an upshift is made from low to intermediate range or from intermediate to high range or from reverse to low range, exhaust from the ratio servo motor being disengaged flows to port 218 and upshift signal line 219 which is connected at port 376 to bore 352. Though the first restricted exhaust 379 provides a first stage restricted exhaust permitting some oil to exhaust, the flow from the servo being exhausted is greater and the oil acts on the free face of land 351d to open valve 351. When the valve 351 opens, exhaust 368 is closed. Upshift signal line 219 is connected to second restricted exhaust 370 and main line 106 is connected to the upshift control line 261 which is connected to a spring chamber 256 of the splitter shift valve unit 224. Main line oil under pressure in chamber 256 acts on plug 254 to downshift the splitter shift valve unit 224 from direct drive to underdrive. The exhaust from the servo motor in line 219 is exhausted through the first and second restricted exhausts 370, 379 which provides a more rapid second stage restricted exhaust and times the exhaust of the servo being disengaged. When the clutch is partially or substantially disengaged, the pressure drops in line 219 sufficient to permit springs 353 to return the valve 351 to the closed position where downshift control line 261 is exhausted through exhaust 368. The remaining oil in the servo being disengaged continues to exhaust through signal line 219 and the first stage exhaust provided by the first restricted exhaust 379. The valve 351 moves up quickly since the spring chamber at the end of bore 352 is vented through the check valve 363 to the free exhaust 364. The valve 351 returns slowly since the spring chamber must be filled with oil drawn through the exhaust 362 located beneath the oil level in the sump and through the orifice 361 to cushion the upshift of the splitter shift valve which may occur when this valve is closed if governor and throttle forces are acting to upshift the splitter shift valve 225 at that time.

When downshifts are made from high to intermediate range or intermediate to low range, or low range to reverse, the exhaust from the servo motor being evacuated is connected through the exhaust downshift signal line 214 to port 377 to act on the free end of land b to open valve 356 and slowly exhaust through first stage restricted exhaust 382. Valve 356 opens quickly since the space at the end of the valve about spring 358 is connected by the check valve 363 to the free exhaust 364. In the open position, the valve 356 connects main line 106 to the upshift control line 236 which is connected to the spring chamber 226 to hold or upshift valve 225 for direct drive and downshift signal line is connected to both the first and second restricted exhausts 382 and 375. This insures, for example, on downshifting from sixth or fifth ratio in high range, a one or two ratio shift to fourth ratio on a manual downshift to intermediate range since fourth ratio is obtained by the combination of intermediate in the three speed unit 46 and direct drive in the splitter gear unit 27. When the shift is completed and the servo motor being evacuated such as the high ratio servo motor is partially or completely evacuated through the first and second restricted exhaust 375 and 382, the pressure in line 214 will drop sufficiently to permit the spring 358 to return the valve 356 to the closed position. Valve 356 will return slowly to cushion the upshift of the splitter shift valve 225, since the spring chamber at the end of bore 357 must be filled through orifice 361. Then the upshift control line 236 will drain through the exhaust 369 and the servo motor being exhausted will continue to exhaust through signal line 214 and first restricted exhaust 382. Thus the servo is properly exhausted and any fluid remaining in the servo or any leakage into the servo and connecting lines will be exhausted.

*Operation—Low Range*

When the engine is started, the engine driven pump 101 delivers oil via line 103 and check valve 105 to the main line 106. As the oil in line 106 reaches an initial pressure level, the oil acting on the unbalanced area of lands 108b and c will overcome the force of spring 134 to raise the valve and supply the excess oil to the converter and brake line 281. When the flow in this line 281 ceases, the pressure rises to the basic regulated pressure level in lines 106 and 281 and moves valve 108 further against spring 134 and land a permits direct exhaust of the front pump oil from line 103 to exhaust 112 to limit the pressure.

The basic main line pressure as controlled by the oil acting on unbalanced lands 108b and c is further controlled by other fluid forces acting on the regulator valve unit 107. This regulated main line oil is connected by line 106 to the cutoff valve unit 180 where in the static position with the lines filled will extend through orifice 187 to the ratio clutch line 190, between lands 181a and b to the lockup supply line 192, to throttle valve unit 149 and to shift control valve unit 350. The converter and brake line 281 is connected between lands b and c of the lockup shift valve 266 to the converter inlet line 12 to fill the converter and the extension of the converter and brake feed 281 to the brake valve unit 305, which is normally closed.

The oil in main line 106 at the regulated pressure is connected through orifice 187 to the ratio clutch line 190 to supply oil under pressure to engage all the ratio servo motors. When the ratio selector valve is in neutral, the ratio clutch line 190, which is connected to the manual selector valve unit 200 between lands a and b, admits the oil to the bore 207 and the space between the lands c and d where it is blocked. The three speed unit lines for high 50, for intermediate 60, for low 75 and for reverse 85, are exhausted through the upshift signal line 219 and first restricted exhaust 379 at the shift control valve unit 350. Thus the three speed unit of the transmission is disengaged in neutral and no drive can be transmitted by the transmission. The ratio supply line 190 is connected to the splitter underdrive line 37 by splitter shift valve unit 224 which is held in the downshift position by the spring 257. This places the splitter gear unit 27 in underdrive. If when accelerating the engine in neutral, the splitter shift valve upshifts to splitter direct drive, the control areas on the valve are proportioned so that the valve will downshift to splitter underdrive when the load is connected to the engine before the vehicle moves.

The torque converter is filled quickly by line 281 and with the splitter unit in low ratio, the operator may now shift the manual selector valve unit 200 into any drive ratio. If he wishes to start the vehicle under heavy load conditions, he will shift to low range where the ratio clutch line 190 will be connected by the manual valve unit 200 to the low line 75 to engage the low gear of the three speed unit. The other three speed unit lines for high 50, and intermediate 60 located above the supplied low line 75 are connected by downshift signal line 214 to first restricted exhaust 382 and the reverse line 85 located below the supplied low line 75 are connected by upshift signal line to first restricted exhaust 379. The splitter gear being in low when the engine is running and the vehicle standing, the vehicle will start in first ratio.

Then as the driver starts the vehicle, he presses the throttle pedal to move the linkage 173 and the throttle valve 150 to deliver throttle oil in the throttle line 166 which has a pressure proportional to the throttle pedal position. The throttle oil in line 166 acts on plug 132 of regulator valve unit 107 to increase main line pressure with increasing throttle pressure. As soon as the throttle is depressed, the throttle oil in 166 will also act on the end of land d of the splitter shift valve 225 to retain it in the low position.

As the vehicle begins to move the tail shaft pump 102 will supply oil via line 104 and check valve 105 to the main line 106 and the converter line 281. The rear pump line 104 is also connected to the splitter shift valve unit 224 to act upon plug 254 to depress the plug and spring 257 to free splitter shift valve 225 to permit an upshift.

The lockup control valve unit 265 is generally calibrated to engage the lockup clutch in first ratio. The main line 106 is connected through the lockup cutoff valve unit 180 to the lockup supply line 192 and the lockup valve unit 265. When the governor force overcomes the throttle and spring forces, the lockup valve 266 moves from disengaed position shown in FIG. 3 to the engaged position, the oil in lockup supply line 192 is connected between lands 266a and b to the lockup clutch line 15. At the time the lockup clutch is engaged, the flow of oil to the converter is curtailed by blocking the connection from the converter and brake feed line 281 between the lands b and c to the converter inlet line 12 forcing the oil to flow around valve 266 in line 281 and through restrictive orifice 295 to the converter inlet line 12. Valve 266 is also provided with hysteresis so that it will not downshift at the upshift speed but only at a lower speed due to the fact that the oil at main line pressure from the line 192 acts on the unbalanced area of lands 266a and b to quickly urge valve 266 to the engaged position during the shift and the valve land d in the engaged position cuts off the throttle line 166 at port 286 which will disconnect the throttle oil from valve 266 if the splitter shift valve 225 is in the upshift position. While splitter shift valve 225 is in the downshift position, throttle line 166 is connected via bore 243 and detent line 251 to lockup clutch valve 266 to provide part throttle downshifts, but after splitter shift valve 225 also upshifts throttle oil line 166 is cut off from both valves so downshift or disengagement of the lockup clutch will occur only at substantially lower speeds or when the throttle is moved to detent position.

When valve 266 is in the disengaged position, throttle oil from line 166 fills bore 271. The flow via detent line 251 to orifice exhaust 250 is slow and does not materially affect the throttle oil pressure. After the upshift, bore 271 is vented via line 251 and orifice exhaust 250 to prevent trapped fluid interfering with movement of valve 266. Throttle oil is always available at port 286 and acts on lockup valve 266 whenever it is in the disengaged position, to provide throttle and governor control of clutch engagement both at starting and after disengagment by the lockup cutoff valve unit 180 for a ratio change. When the lockup clutch is engaged, the lockup oil line 15 is connected to the pressure regulator valve unit 107 below the land 108c to decrease the main line pressure.

When the pressure of the governor oil in line 52 rises sufficiently, the governor oil acting with spring 234 upshifts the valve against the throttle oil from line 166 to shift the splitter gear to direct drive and the transmission to second ratio. In upshift position, valve 225 connects the low line 37 to exhaust 244 and connects the ratio clutch line 190 to the direct drive clutch line 40. Hysteresis is provided in this valve to prevent downshift at the same speed as the upshift by the main line oil supplied by line 190 acting on the unbalanced area of lands a and b to tend to hold the valve in the upshift position and by the land d cutting off the throttle pressure line 166. The space in bore 243 at the free end of land 225d is then exhausted via detent line 251 to orifice exhaust 250. The throttle oil in line 166 flows in an annular port around the land to the continuation of line 166 to the lockup valve unit 265 and is available in the event the lockup clutch is disengaged by the lockup clutch cutoff valve 180 for controlled reengagement by both the lockup cutoff valve 180 and the lockup valve unit 265 under governor and throttle force.

Since the splitter shift valve 225 in upshift position cuts off the throttle line 166, and the lockup clutch valve 266 has already shifted to block the throttle oil connection from line 166 via bore 271 and detent line 251 to spring chamber 256, this valve will not be downshifted by an increase in throttle pressure or at part throttle. Since in the upshift position, only governor pressure and the spring 234 act on the valve 225, it will not be downshifted by a reduction in governor pressure or speed but only by a forced downshift of detent valve 167 or a downshift of the lockup clutch valve 266 which will connect throttle pressure through bore 271 and detent line 251 to spring chamber 256 of valve 225.

The flow of oil in the ratio clutch line 190 to fill the servo to engage the splitter direct clutch to make this shift or to fill any other ratio clutch for any other shift as explained above, causes a difference in pressure across the orifice 187. Since the line 106 at one side of the orifice is connected by port 186 to the lower end of the valve and the line 190 at the other side of the orifice is connected by port 196 to the other end of the valve, the lockup cutoff valve 180 is closed whenever flow occurs from main line 106 through orifice 187 to ratio clutch line 190. The closing of the lockup cutoff valve 180 disengages the lockup clutch by cutting off the connection of the main line 106 to lockup supply line 192.

When the throttle pedal is advanced to the full open or just beyond the full open position, the detent valve 167 connects the throttle pressure in line 166 which is now equal to main line pressure to the detent line 251. The detent line is connected to the splitter shift valve 224 and acts upon the lower face of land 225d to downshift the splitter valve 225 at higher speeds and is connected to the lockup valve unit 265 to act upon the lower face of land 266d to downshift lockup valve at higher speeds. Thus when the throttle pedal is moved to detent position when the transmission is in second ratio, the splitter shift valve unit 224 will downshift to shift the splitter gear unit 27 from splitter direct to splitter low or underdrive to shift the transmission to first ratio and at the same time when the transmission is in lockup the lockup valve unit 265 will be shifted to the closed position to disengage the lockup clutch and reinstate converter drive. When the throttle pedal is returned to the normal throttle range, detent line 251 is disconnected from the throttle line 166 and the pressure in the detent line 251 is released through orifice exhaust 250. This orifice is small enough so that it does not interfere with the build-up of the detent control pressure in the detent line 251. The lockup clutch will be disengaged when the splitter gear low servo is filled via line 37 so that flow in the ratio clutch line 190 stops and lockup cutoff valve unit 180 opens to supply the lockup shift valve unit 265 and this valve has upshifted to supply the lockup clutch servo.

*Low-Intermediate Range*

When the vehicle has reached full speed in the second ratio, the manual selector valve unit 200 is shifted to intermediate range which connects the ratio supply line 192 at the valve unit 200 to the intermediate line 60 to shift the three speed unit 46 to intermediate ratio. The springs retracting the low friction engaging device force the oil under pressure back through the low friction engaging device line 75 and the signal line 219 and to connect the low servo motor 74 to the first restricted exhaust 379 to slowly bleed or drain the oil from the low servo to open valve 351 and to connect signal line 219 to the second restricted orifice 370 to provide a faster second stage bleed. The upshift control valve 351 connects main line oil from line 106 to downshift control line 261 to act upon the plug 254 with spring 257 to overcome rear pump oil acting on the other side of the plug to downshift the splitter shift valve 225 to shift the splitter gear from direct to underdrive and thus with intermediate in the three speed unit establish third ratio in the transmission. The splitter gear unit 27 is thus downshifted quickly, at the beginning of the release of low drive in the three speed unit and before engagement of intermediate drive in the three speed unit to prevent a shift from second to fourth ratio and insure a shift to third ratio. When the pressure in low servo motor 74 is reduced, the spring will close valve 351 to block line 106 and connect downshift line 261 to exhaust 368 and block second restricted exhaust 370. The low servo remains connected to the first restricted exhaust 379. If the governor and throttle forces on splitter shift valve 225 call for an upshift when valve 351 is closed, the upshift of valve 225 will be delayed and cushioned since closing movement of valve 351 is slow because chamber 352 must be filled through orifice 361. This action would delay and cushion a third to fourth ratio shift occurring immediately after a second to third ratio shift.

During these shifts whenever there is flow to any ratio establishing servo, there will be flow in the ratio clutch line 190 which will close the lockup cutoff valve unit 180 to block the flow to the lockup supply line 192 and this will disengage the lockup clutch. When the ratio servos are fully engaged, the flow in line ratio supply line 190 will stop and valve unit 180 will open to supply oil via line 192 and the lockup shift valve unit 265 to the lockup clutch, as more fully explained above in connection with low range operation and the lockup cutoff valve unit 180.

*Intermediate Range*

Under normal driving conditions the shift from low ratio to intermediate ratio in the three speed unit and the shift from direct to low in the splitter gear unit will reduce engine speed so that the speed of the splitter gear output or connecting shaft 33 which is connected to the Pitot governor 51 is less than the speed at which the splitter shift valve shifted from first to second ratio in low range. The splitter gear which had been downshifted to low by the shift control valve 352 and shift valve unit 224 will remain in low. As the engine speed is again increased, when the connecting shaft reaches the same speed range, the governor pressure overcomes throttle pressure and shifts the splitter shift valve unit 224 to the upshift position to engage direct drive in the splitter unit and with intermediate in the three speed unit, place the transmission in fourth ratio.

Under moderate load and grade conditions, the vehicle may be started in intermediate range when the selector valve unit 200 connects ratio clutch line 190 to intermediate line 60 to engage intermediate in the three speed unit 46. Since the splitter unit is in underdrive, as explained above, under "Neutral," the vehicle starts in third ratio. Then in the same manner as in the above-described first to second ratio shift in low range, the vehicle movement develops pressure in rear pump output line 104 which conditions or releases valve 225 for an upshift under the influence of governor and throttle forces. When these forces reach the shift point of splitter shift valve 225, it upshifts to place the splitter gear 27 in direct drive, as explained above in "Low Range." With the three speed unit 47 in intermediate and the splitter unit 27 in direct, the transmission is in fourth ratio.

If the throttle is advanced to the detent position when the transmission is in the fourth ratio, the detent oil in line 251 will in the same way as explained above in "Low Range," downshift the splitter shift valve unit 224 to downshift the splitter gear 27 from direct drive to low and the transmission from fourth to third ratio and at the same time, downshift the lockup shift valve unit 265 to disengage the lockup clutch. When the lockup clutch is disengaged in this manner, it provides faster disengagement than when the lockup cutoff valve unit is employed and permits the torque converter to absorb the initial shock of the downshift.

*Intermediate-High Range*

When the vehicle has reached full speed with the transmission in the fourth ratio the manual selector valve unit 200 may be shifted from the intermediate position to the high position which by connecting ratio clutch line 190 to the high clutch line 50 engages the high clutch. At the same time, the intermediate line 60 is connected through the signal line 219 to orifice exhaust 379 and the upshift control valve 351 to open the upshift control valve 351 providing a controlled exhaust for the intermediate servo and a forced downshift for the splitter gear valve unit 224. This insures the splitter gear unit will be shifted to or held in low ratio so that when the three speed unit 46 shifts from intermediate to high ratio, the transmission will shift from fourth to fifth ratio. The action of control valve 351 during the fourth to fifth ratio shift is similar to the action during the second to third ratio shift described above in low-intermediate range. As the oil pressure builds up in the high clutch line 50, the oil acts upon the plug 128 of the regulator valve unit 107 to reduce main line pressure, if it is not already reduced by the lockup clutch oil in line 15.

*High Range*

The shift in three speed unit 46 to high ratio and in the splitter unit 27 to low ratio will generally lower the speed of the engine and connecting shaft 33 and thus lower the Pitot governor pressure in line 52 below the value required to upshift the splitter shift valve unit 224. The vehicle will then remain in fifth ratio. Though it is not normal, the vehicle may, under very light load conditions, be started in high range by moving selector valve unit 200 from neutral to high range to engage high of the three speed unit 46. Since the splitter gear unit is in underdrive, as explained above in "Neutral," the vehicle would start in fifth ratio and the vehicle movement would condition the shift valve 225 for an upshift as in low range.

When the engine and vehicle speed increase, the governor pressure will increase and upshift the valve 225 at the same shift point as modified by throttle pressure to upshift the splitter gear unit from low to direct, as explained above in "Low" and "Intermediate" ranges. With both the splitter gear and the three speed unit in direct, the transmission is in sixth ratio.

These shifts of the three speed unit from intermediate to high and the shifts of the splitter gear between low and direct cause flow in the ratio clutch line 190 which closes the lockup cutoff valve unit 180 to disconnect the lockup clutch during each shift interval as explained above.

When in sixth ratio movement of the throttle pedal in the detent position will likewise supply oil under pressure to the detent line 251 to downshift the splitter shift valve unit 224 and the lockup control valve unit 265 as explained above in "Low Range" to provide fifth ratio and converter drive. When in fifth ratio, the movement of the throttle to detent position will merely disconnect the lockup clutch.

*Upshifts*

It will also be appreciated that the transmission may be manually upshifted from either first or second ratio in low range to intermediate range or high range or from third or fourth ratio in intermediate to high range depending on the driving requirement. If the splitter unit is in low when an upshift is made, the upshift control valve 351 will be actuated but will merely hold the splitter shift valve unit 224 in the low position during the upshift interval. If the splitter gear is in direct, it will be downshifted, as explained above, to or held in low on all range upshifts and reverse to low range shift.

*Downshifts*

When the transmission is in high ratio, it may be downshifted by easy stages through intermediate to low or it may be jump-shifted directly to low depending upon the driving and road conditions. When the transmission is in fifth or sixth ratio and the manual control in high range, the control may be shifted to the intermediate or low range. The manual selector valve, when moved from high to intermediate range will supply main line oil to the intermediate line 60 and connect the high clutch line 50 to the downshift signal line 214 so the pressure created by the high clutch retraction spring will open the downshift valve 356. The downshift valve 356 acts in the same way as the upshift valve 351 and exhausts the line 214 via restricted orifices 375 and 382 and connects main line 106 to the upshift control line 236 which will either upshift the splitter shift valve 225 or hold it in the upshift position. The shift valve 225 in the upshift position will connect the ratio supply line 190 to the direct drive clutch line 40 of the splitter gear unit 27. This will insure a shift from fifth or sixth ratio in high range to fourth ratio, intermediate range and prevent a shift directly to the third ratio. When the pressure in high clutch line is reduced, spring 358 slowly closes valve 356 to connect upshift line 236 to exhaust 369 to condition valve 225 for a downshift. The high servo motor 49 remains connected via lines 50 and 214 to restricted exhaust 382.

A downshift from fourth ratio will occur when reduced speed lowers governor pressure to downshift the splitter valve 225 and splitter gear unit to underdrive which, in intermediate range, provides third ratio. Moving the throttle to detent position will also provide third ratio at a higher speed.

Movement of the manual selector valve unit 200 from high or intermediate to low range will connect the ratio supply line 190 to low line 75 and connect the high or intermediate friction engaging device line 60 to the downshift signal line 214. This will engage the low friction engaging device of the three speed unit and open the downshift control valve 356 to insure that the splitter shift valve 225 is in the upshift position so that a shift from third or fourth ratio to first is impossible and the smoother shift to second ratio is made. In second ratio, either reduced speed or moving, the throttle to detent position will provide a downshift to first ratio.

*Reverse*

Reverse drive is provided when the manual selector valve unit 200 is placed in reverse range connecting reverse line 85 to the main line 106 to engage reverse drive of the three speed unit 46. The other lines, high 50, intermediate 60 and low 75, are connected via line 214 to restricted exhaust 382. Since the rear pump does not supply oil when reversely driven, the plug 254 is not depressed and spring 257 holds the splitter shift valve unit 224 in downshift position and reverse drive is provided by low in the splitter unit and reverse in the three speed unit.

Brake Operation

When the dynamic brake is not in operation, the brake out line 30 drains the brake chamber through the space between the lands c and d of brake valve 306 to exhaust 338. The converter outlet line 13 is always connected through check valve 334 and port 335 around land c to cooler inlet line 320. When the brake is applied by opening brake valve 306 the land d closes exhaust 338 and connects the brake supply line 281 and the cooler outlet line 321 via the ports 318 and 323 around land b to port 330 which conveys the combined flow to the brake inlet line 29. During brake operation oil which is pumped out of the brake chamber by the centrifugal action of the brake enters the brake out line 30 and flows between the lands 306c and d to port 335 where it joins the converter outlet line 13 and flows via cooler inlet line 336 to the oil cooler 320. This pumping action and the flow resistance or restriction of these lines provide an outlet pressure proportional to brake torque. The check valve 334 prevents reverse flow in the converter outlet line 13 and thus prevents the hot brake oil in the brake outlet 30 flowing backward through the converter outlet line 13 to overheat the converter.

The operator in moving the brake apply linkage 310 must move the valve 306 against the force of spring 314 and the brake out pressure connected to the spring chamber at port 315. This provides a force resisting movement of the brake valve proportional to the braking effort. In this way the operator can judge the extent of the braking effort of the hydrodynamic brake. With this transmission control, the effectiveness of the hydrodynamic brake may be changed by placing the transmission in different ranges. If it is wished to obtain more braking effort than is being obtained in high range, the transmission may be shifted to intermediate range or for more braking, to low range. When the brake is employed on a downgrade, the vehicle speed is generally such that it will upshift to the higher ratio in the range being used.

Though, to facilitate reference to the drawings, parts have been referred to as top and bottom and directions as up and down, it will be appreciated that they are intended to define relative position since the parts will operate in any position.

The above described specific embodiment is illustrative of the invention which may be employed in modifications within the scope of the appended claims.

We claim:

1. In a transmission, an input and an output member, transmission gearing connecting said input and output members having a first unit and a second unit each having a plurality of ratios, servo means to engage each of said ratios of said first and second transmission units, a source of fluid under pressure, a first control means movable from one to another position to actuate said servo means to engage one or another of said ratios of said second transmission unit, a second control means movable to one or another position to actuate said servo means to engage one or another ratio of said first transmission unit, upshift control means operable in one position to hold said second control means in said another position and inoperable in another position, downshift control means operable in one position to hold said second control means in said one position and inoperative in another position, said first control means on an upshift from one to another ratio of said second unit being operable during release of said one ratio servo to move said upshift control means to said operable position, and said first control means on a downshift from another to one ratio of said second unit being operable during release of said another ratio servo to move said downshift control means to said operable position.

2. In a transmission, an input and an output member, transmission gearing connecting said input and output members having a first unit and a second unit each having a plurality of ratios, fluid servo motor means to engage each of said ratios of said first and second transmission units, a source of fluid under pressure, a first control valve movable from one to another position to connect said source to one or another of said ratios of said second transmission unit, a second control valve movable to one or another position to connect said source to servo motors to engage one or another ratio of said first transmission unit, upshift control valve means having an open position connecting said source to said second control valve to hold it in said another position and a closed position blocking said source, downshift control valve means having an open position connecting said source to said second control valve to hold it in said one position and a closed position blocking said source, said first valve on an upshift from one to another ratio of said second unit connecting the exhaust from said one ratio servo to said upshift control valve to open said valve, and said first valve on a downshift from another to one ratio of said second unit connecting the exhaust from said another ratio servo to said downshift control valve to open said valve.

3. In a transmission, an input member, an intermediate member and an output member, a first transmission unit driven by said input member and driving said intermediate member and having a plurality of ratios, a second transmission unit driven by said intermediate member and driving said output member and having a plurality of ratios between said intermediate and output member providing a transmission having a plurality of ranges, each range having a plurality of ratios provided by said first transmission unit, fluid servo motor means to engage each of said ratios of said first and second transmission, said first transmission unit having governor means, a source of fluid under pressure, a manual control valve movable from one to another position to connect said source to one or another of said ratios of said second transmission unit to provide one or another range, and automatic control valve movable by said governor means to one or another position to connect said source to servo motors to engage one or another ratio of said first transmission unit, upshift control valve means having an open position connecting said source to said automatic control valve to hold it in said another position and a closed position blocking said source, a downshift control valve means having an open position connecting said source to said automatic control valve to hold it in said one position and a closed position blocking said source, said manual valve on an upshift from one to another range connects the exhaust from said one range servo to said upshift control valve to open said valve, and said manual valve on a downshift from another to one range connects the exhaust from said another range servo to said downshift control valve to open said valve.

4. In a transmission, an input and an output member, transmission gearing connecting said input and output members having a first unit and a second unit each having a plurality of ratios, fluid servo motor means to engage each of said ratios of said first and second transmission units, a source of fluid under pressure, a first control valve movable from one to another position to connect said source to one or another of said ratios of said second transmission unit, a second control valve movable to one or another position to connect said source to servo motors to engage one or another ratio of said first transmission unit, an upshift control valve having an open position connecting said source to said second control valve to hold it in said another position and a closed position blocking said source, a downshift control valve having an open position connecting said source to said second valve to hold it in said one position and a closed position blocking said source, a first and second restricted exhaust, said first valve on an upshift from one to another ratio of said second unit connecting the exhaust from said one ratio servo to said first restricted exhaust and to said upshift control valve to open said valve to hold said automatic control valve in said another position and said first valve on a downshift from another to one ratio of said first unit connecting the exhaust from said another ratio servo to said second restricted exhaust and to said downshift control valve to open said valve to hold said automatic control valve in said another position.

5. In a transmission for a vehicle having a throttle pedal, an input member, an intermediate member and an output member, a first transmission unit driven by said input member and driving said intermediate member and having a plurality of ratios, a second transmission unit driven by said intermediate member and driving said output member and having a plurality of ratios between said intermediate and output member providing a transmission having a plurality of ranges, each range having a plurality of ratios provided by said first transmission unit, fluid servo motor means to engage each of said ratios of said first and second transmission units, a source of fluid under pressure, a throttle valve connected to said source providing throttle fluid at a pressure proportional to throttle pedal position, a governor driven by said intermediate member and connected to said source providing governor fluid at a pressure proportional to intermediate member speed, a manual control valve movable from one to another position to connect said source to one or another of said ratios of said second transmission unit to provide one or another range, an automatic control valve movable to one or another position to connect said source to servo motors to engage one or another ratio of said first transmission unit, a spring and said governor fluid acting on said automatic control valve to urge it toward said one position, said throttle fluid acting on said automatic control valve to urge it toward said another position, an upshift control valve having an open position connecting said source to said automatic control valve to hold it in said another position and a closed position blocking said source, a downshift control valve having an open position connecting said source to said automatic control valve to hold it in said one position and a closed position blocking said source, said manual valve on an upshift from one to another range connecting the exhaust from said one range servo to said upshift control valve to open said valve, and said manual valve on a downshift from another to one range connecting the exhaust from said another range servo to said downshift control valve to open said valve.

6. In a transmission for a vehicle having a throttle pedal, an input member, an output member, transmission means connecting said input and output members providing a plurality of ratios, one servo motor to engage one ratio, another servo motor to engage another ratio, control valve means operative in one position to actuate one servo motor to engage one ratio and in another position to actuate another servo motor to engage another ratio, a governor driven by said output shaft providing a governor fluid having a pressure proportional to output shaft speed, spring means and said governor fluid acting on said control valve means to urge said control valve means to said one position, means providing a throttle fluid having a pressure proportional to the throttle pedal position acting on said control means to urge said control means to said another position, disabling spring means enaging said control valve means to normally hold said control valve means in said another position, and means providing a control fluid responsive to rotation of said output member acting on said disabling spring means to disengage said disabling spring means to permit movement of said control means between said one position and said another position.

7. In a transmission for a vehicle having a throttle pedal, an input member, an output member, transmission means connecting said input and output members providing a plurality of ratios, control means operative in one position to actuate said transmission means to engage one ratio and in another position to engage another ratio, spring means and governor means responsive to the speed of one of said members acting on said control means to urge said control means to said one position, means providing a force proportional to the throttle pedal position acting on said control means to urge said control means to said another position, a disabling spring engaging said control means to normally hold said control means in said another position, and means responsive to rotation of said output member to disengage said disabling spring to permit movement of said control means between said one position and said another position.

8. In a transmission, an input and an output member, transmission gearing connecting said input and output members having a plurality of ranges, fluid servo means to engage each of said ratios of said first and second transmissions, a source of fluid under pressure, control valve means movable from one to another position to actuate said servo means to engage one or another of said servo means of said second transmission unit to provide one or another ratio, disabling spring means engaging said control valve to normally hold it in said another position, and control means responsive to rotation of said output member to disengage said disabling spring means to permit movement of said automatic control valve between said one and another positions.

9. In a transmission, an input and an output member, transmission gearing connecting said input and output members having a first unit and a second unit each having a plurality of ratios, fluid servo means to engage each of said ratios of said first and second transmissions, a source of fluid under pressure, a first control valve movable from one to another position to connect said source to one or another of said ratio servo means of said second transmission unit to provide one or another ratio of said second unit, a second control valve movable to one or another position to connect said source to servo means to engage one or another ratio of said first transmission unit, disabling spring means engaging said second control valve to normally hold it in said another position, and control means responsive to rotation of said output member to disengage said disabling spring means to permit movement of said second control valve between said one and another positions.

10. In a transmission, an input and an output member, transmission gearing connecting said input and output members having a first unit and a second unit, said second transmission unit providing a plurality of forward ratios and reverse providing a transmission having a plurality of forward ranges and reverse, and each range having a plurality of ratios and reverse having one ratio provided by said first transmission unit, fluid servo means to engage each of said ratios of said first and second transmissions, a source of fluid under pressure, a manual control valve movable from one to another position to connect said source to one or another of said ratio servo means of said second transmission unit to provide one or another range, an automatic control valve movable to one or another position to connect said source to servo means to engage one or another ratio of said first transmission unit, disabling spring means engaging said automatic control valve to normally hold it in said another position, and control means active in response to forward rotation of said output member to disengage said disabling spring means in response to forward vehicle movement to permit movement of said automatic control valve between said one and another position and inactive in response to rearward rotation of said output member to permit said disabling spring means in response to rearward vehicle movement to hold said valve in said one position.

11. In a transmission for a vehicle having a throttle pedal, an input member, an intermediate member and an output member, a first transmission unit driven by said input member and driving said intermediate member and having a plurality of ratios, a second transmission unit driven by said intermediate member and driving said output member and having a plurality of ratios between said intermediate and output member providing a transmission having a plurality of ranges, each range having a plurality of ratios provided by said first transmission unit, fluid servo means to engage each of said ratios of said first and second transmissions, a cource of fluid under pressure, a governor driven by said intermediate member and connected to said source providing governor fluid at a pressure proportional to intermediate member speed, a manual control valve movable from one to another position to connect said source to one or another of said ratio servo means of said second transmission unit to provide one or another range, an automatic control valve movable to one or another position to connect said source to servo means to engage one or another ratio of said first transmission unit, means including said governor fluid acting on said automatic control valve to control movement between said one and another positions, disabling spring means engaging said automatic control valve to normally hold it in said another position, and control means responsive to rotation of said output member to disengage said disabling spring means to permit movement of said automatic control valve between said one and another positions.

12. In a transmission for a vehicle having a throttle pedal, an input member, an intermediate member and an output member, a first transmission unit driven by said input member and driving said intermediate member and having a plurality of ratios, a second transmission unit driven by said intermediate member and driving said output member and having a plurality of ratios between said intermediate and output member providing a transmission having a plurality of ranges, each range having a plurality of ratios provided by said first transmission unit, fluid servo means to engage each of said ratios of said first and second transmission units, a source of fluid under pressure, a throttle valve connected to said source providing throttle fluid at a pressure proportional to throttle pedal position, a governor driven by said intermediate member and connected to said source providing governor fluid at a pressure proportional to intermediate member speed, a manual control valve movable from one to another position to connect said source to one or another of said ratio servo means of said second transmission unit to provide one or another range, an automatic control valve movable to one or another position to connect said source to servo means to engage one or another ratio of said first transmission unit, a spring and said governor fluid acting on said automatic control valve to urge it toward said one position, said throttle fluid acting on said automatic control valve to urge it toward said another position, disabling spring means engaging said automatic control valve to normally hold it in said another position, and control means responsive to rotation of said output member to disengage said disabling spring means to permit movement of said automatic control valve between said one and another positions.

13. In a transmission, an input and an output member, transmission gearing connecting said input and output members having a plurality of ratios, fluid servo means to engage each of said ratios of said transmission, a source of fluid under pressure, a regulating valve regulating the pressure of the fluid from said source at a normal pressure, a control valve movable from one to another position to connect said source to one or another of said servo means of said transmission to provide one or another ratio, and said control valve in one position controlling said regulator valve to increase the pressure above said normal pressure, and in another position controlling said regulator valve to decrease the pressure below said normal pressure.

14. In a transmission for a vehicle having a throttle pedal, an input and an output member, transmission gearing connecting said input and output members having a plurality of ratios, fluid servo means to engage each of said ratios of said transmission, a source of fluid under pressure, a regulating valve regulating the pressure of the fluid from said source, throttle means providing a throttle force proportional to throttle pedal position, a control valve movable from one to another position to connect said source to one or another of said servo means of said transmission gearing to provide one or another ratio, and said manual valve in one position controlling said regulator valve to increase the pressure, and in another position controlling said regulator valve to decrease the pressure.

15. In a transmission for a vehicle having a throttle pedal, an input member, an intermediate member and an output member, a first transmission unit driven by said input member and driving said intermediate member and having a plurality of ratios, a second transmission unit driven by said intermediate member and driving said output member and having a plurality of ratios between said intermediate and output members providing a transmission having a plurality of ranges, some ranges having a plurality of ratios provided by said first transmission unit, fluid servo means to engage each of said ratios of said first and second transmissions, a source of fluid under pressure, a regulating valve regulating the line pressure of the fluid from said source, a throttle valve connected to said source providing throttle fluid at a pressure proportional to throttle pedal position, a governor driven by said intermediate member and connected to said source providing governor fluid at a pressure proportional to intermediate member speed, a manual control valve movable from one to another position to connect said source to one or another of said ratio servo means of said second transmission unit to provide one or another range, an automatic control valve movable to one or another position to connect said source to servo means to engage one or another ratio of said first transmission unit, a spring and said governor fluid acting on said automatic control valve to urge it toward said one position, said throttle fluid acting on said automatic control valve to urge it toward said another position, said throttle fluid acting on said regulator valve to increase the line pressure with increasing pressure of said throttle fluid, and said manual valve in one position acting on said regulator valve to increase the pressure, and in another position acting on said regulator valve to decrease the pressure.

16. In a transmission, an input member, an intermediate member and an output member, a first transmission unit driven by said input member and driving said intermediate member and having a plurality of ratios, a second transmission unit driven by said intermediate member and driving said output member and having a plurality of ratios between said intermediate and output members providing a transmission having a plurality of ranges, some ranges having a plurality of ratios provided by said first transmission unit, fluid servo means to engage each of said ratios of said first and second transmissions, a source of fluid under pressure, a regulator valve regulating the pressure of the fluid from said source, governor means including a throttle valve connected to said source providing throttle fluid at a pressure proportional to throttle pedal position, a manual control valve movable from one to another position to connect said source to one or another of said ratio servo means of said second transmission unit to provide one or another range, an automatic control valve movable by said governor means to one or another position to connect said source to servo means to engage one or another ratio of said first transmission unit, said throttle fluid acting on said regulator valve to increase the pressure with increasing pressure of said throttle fluid, and said manual valve in one position acting on said regulator valve to increase the pressure, and in another position acting on said regulator valve to decrease the pressure.

17. In a transmission for an engine having a throttle pedal movable through a normal range to a detent position, input, intermediate and output members, a fluid drive and a direct drive clutch connecting said input and intermediate members, a multiratio transmission unit connecting said intermediate and output members, fluid means to engage said direct drive clutch and to engage said ratios of said transmission unit, a source of fluid under pressure, throttle valve means to provide throttle fluid at a pressure proportional to throttle pedal position in the normal range, means to provide detent fluid at a preessure at least equal to maximum throttle pressure, a first control means movable from one to another position to connect said source and said fluid means to control said direct drive clutch, a second control means movable from one to another position connecting said source and said fluid means to control said multiratio transmission, each of said control means having an unbalanced area, first conduit means connecting said throttle valve means to supply throttle fluid to said unbalanced areas when said control means are in said one position and said control means blocking said first conduit means at said last-mentioned control means when in said another position to cut off flow to said last-mentioned control means, and second conduit means connecting said throttle valve means to supply detent fluid to said unbalanced areas of said first and second control means in both said one and said another positions.

18. In a transmission for an engine having a throttle pedal movable through a normal range to a detent position, input, intermediate and output members, a fluid drive and a direct drive clutch connecting said input and intermediate members, a multiratio transmission unit connecting said intermediate and output members, fluid means to engage said direct drive clutch and to engage said ratios of said transmission unit, a source of fluid under pressure, throttle valve means to provide throttle fluid at a pressure proportional to throttle pedal position in the normal range, means to provide detent fluid at a pressure at least equal to maximum throttle pressure, a first control means movable from one to another position to connect said source and said fluid means to control said direct drive clutch, a second control means movable from one to another position connecting said source and said fluid means to control said multiratio transmission, each of said control means having an unbalanced area, and conduit means connecting said throttle valve means to supply throttle fluid to said unbalanced areas when said control means are in said one position and said control means blocking said first conduit means at said last-mentioned control means when in said another position to cut off flow to said last-mentioned control means.

19. In a hydrodynamic brake, a brake chamber having an inlet and an outlet, a rotor, a stator, a source of fluid under pressure connected to said inlet to supply fluid to said chamber, control means to control the supply of fluid to said chamber, manual means movable from a brake on position to a brake off position to actuate said control means, means connected to the outlet of said chamber to provide a force proportionate to the braking effort resisting movement of said manual means so the operator can feel the braking effort.

20. In a hydrodynamic brake, a brake chamber having an inlet and an outlet, a rotor, a stator, a source of fluid under pressure connected to said inlet to supply fluid to said chamber, a valve to control the supply of fluid to said chamber, manual means to move said valve from a brake on position to a brake off position to actuate said control means, said valve having an unbalanced area, means connected to the outlet of said chamber providing a fluid force proportionate to the braking effort connected to act on said unbalanced area to resist movement of said manual means so the operator can feel the braking effort.

21. In combination, a multiratio transmission having an input member and an output member and a plurality of ratios in each of several ranges, a control mechanism having manual means for selecting any one of said several ranges to make available the ratios in the selected range and eliminate the ratios in the other range, automatic means for selecting any one of said plurality of ratios in the range selected by said manual means, a hydrodynamic brake having a rotor, said rotor being connected to said transmission to be driven at one speed with respect to said output member when one range is manually selected and at a faster speed with respect to said output member when another range is manually selected.

22. In combination, a multiratio transmission having an input member and an output member and a ratio in each of several ranges, a control mechanism having manual means for selecting any one of said several ranges to make available the ratio in the selected range and eliminate the ratio in the other range, a hydrodynamic brake having a rotor, said rotor being connected to said transmission to be driven at one speed with respect to said output member when one range is manually selected and at a faster speed with respect to said output member when another range is manually selected.

23. In a transmission, a fluid drive having a chamber for the driving and driven members with a fluid drive inlet and an outlet, a hydrodynamic brake having a chamber for the rotor and stator with a brake inlet and outlet, a sump, a source of fluid under pressure, a cooler, a one-way valve, control valve means having a brake off position connecting said source to said fluid drive inlet, said fluid drive outlet through said one-way valve and cooler to said sump and a brake on position retaining said brake off connections and connecting said source to said brake inlet and said fluid drive outlet through said one-way valve and cooler to said brake inlet and said brake outlet being connected to said cooler.

24. In a transmission, a fluid drive having a chamber for the driving and driven members with a fluid drive inlet and an outlet, a hydrodynamic brake having a chamber for the rotor and stator with a brake inlet and an outlet, a sump, a source of fluid under pressure, a cooler, a one-way valve, control valve means having a brake off position connecting said source to said fluid drive inlet, said fluid drive outlet through said one-way valve and cooler to said sump and a brake on position retaining said brake off connections and connecting said source to said brake inlet and said fluid drive outlet through said one-way valve and cooler to said brake inlet and said brake outlet by-passing said one-way valve and being connected to said cooler.

25. In a transmission, a fluid drive having a chamber for the driving and driven members with an inlet and an outlet, a hydrodynamic brake having a chamber for the rotor and stator with an inlet and an outlet, a source of fluid under pressure, a fluid drive inlet line continuously connecting said source wtih said fluid drive inlet, a cooler, a one-way valve, a fluid drive outlet line continuously connecting said fluid drive outlet through said one-way valve to said cooler, a cooler outlet line connected to exhaust, a brake inlet line connected to said brake inlet, a brake outlet line connected to said brake outlet, a brake supply line connected to said source, and control valve means having a brake off position blocking said brake supply line and connecting said brake inlet line and said brake outlet line to exhaust and a brake on position connecting said cooler outlet line and said brake supply line to said brake inlet line, and connecting said brake outlet to said fluid drive outlet between said one-way valve and said cooler.

26. In a transmission, a fluid drive having a chamber with an inlet and an outlet, a hydrodynamic brake having a chamber with an inlet and an outlet, a source of fluid under pressure, a fluid drive inlet line continuously connecting said source with said fluid drive inlet, a cooler, a one-way valve, a fluid drive outlet line continuously connecting said fluid drive outlet through said one-way valve to said cooler, a cooler outlet line connected to exhaust, a brake inlet line connected to said brake inlet, a brake outlet line connected to said brake outlet, a brake supply line connected to said source, control valve means having a brake off position blocking said brake supply line and connecting said brake inlet line and said brake outlet line to exhaust and a brake on position connecting said cooler outlet line and said brake supply line to said brake inlet line, and connecting said brake outlet to said fluid drive outlet between said one-way valve and said cooler, said control valve means having an unbalanced area, and means to connect said brake outlet line providing pressure proportional to the brake effort to said unbalanced area of said control valve means to provide a force resisting movement proportional to the braking effort.

27. In combination, a multiratio transmission having a plurality of ratios having different torque multiplication values, a control mechanism for establishing said ratios having manual means settable to a plurality of ranges and operative to condition said control mechanism for operation in any one of a plurality of ranges, a group consisting of a plurality of ratios being establishable in each range, each of said groups having at least one different ratio, automatic means for upshifting and downshifting to either one of said plurality of ratios available in each group of ratios of the range conditioned for operation by said manual means and overcontrol means operative in response to said manual means for controlling said automatic means effective during a manual change of selection of range from one range to another range to select the ratio in the group of said another range having a torque multiplication value nearest the torque multiplication values of the ratios in the group of said one range regardless of the ratio selected by said automatic means.

28. In combination, a multiratio transmission having a plurality of ratios having decreasing torque multiplication values, a control mechanism for establishing said ratios having manual means settable to a plurality of ranges and operative to condition said control mechanism for operation in any one of a plurality of ranges, a group consisting of a plurality of ratios being establishable in each range, each of said groups in consecutive order having at least one ratio having a lower torque multiplication value, automatic means for selecting by upshifting or downshifting at predetermined transmission speed any one of said plurality of ratios available in each group of ratios of the range conditioned for operation by said manual means, at least one of said predetermined speeds in each group of ratios being different, and overcontrol means operative in response to said manual means for controlling said automatic means effective during a manual change of selection of range from one range to another range to select the ratio in the group of said another range having a torque multiplication value nearest the torque multiplication values of the ratios in the group of said one range regardless of the ratio selected by said automatic means.

29. In combination, a multiratio transmission having a plurality of ratios having decreasing torque multiplication values operative in each of a plurality of ranges, each consisting of a group of ratios with each group having at least one ratio having a lower torque multiplication value, a control mechanism for establishing said ratios having manual means settable to a plurality of ranges and operative to condition said control mechanism for operation in any one of said plurality of ranges with a group consisting of a plurality of ratios being establishable in each range, each of said groups having at least one ratio having a lower torque multiplication than another group, and automatic speed controlled means for upshifting and downshifting to any one of said plurality of ratios in the group of the range conditioned for operation by said manual means, signal means operative in response to a change of ranges by said manual means to effect the disengagement of one ratio during a manual shift from one range to another range to provide a signal, and overcontrol means actuated by said signal of said signal means during a manual shift from one range to another range to select the ratio in said another range having a torque multiplication value nearest the torque multiplication values of the ratios in said one range regardless of the ratio selected by said automatic means.

30. In combination, a multiratio transmission having a plurality of ratios having decreasing torque multiplication values operative in each of a plurality of ranges, a control mechanism for establishing said ratios having manual means settable to a plurality of range conditions and operative to condition said control mechanism for selecting any one of said plurality of ranges with a group consisting of a plurality of ratios establishable in each range, each of said groups having at least one ratio having a different value, and automatic means for automatically shifting at predetermined speeds to any one of said plurality of ratios in each of said groups of the range conditioned for operation by said manual means, said predetermined speeds being different in each range, signal means operative in response to a change of selection of ranges by said manual means to effect the disengagement of one ratio during a manual shift from one range to another range, and overcontrol means actuated by said signal means during a manual shift from one range to another range to select the ratio in said another range having a torque multiplication value nearest the torque multiplication values of the ratios in said one range regardless of the ratio selected by said automatic means.

31. In combination, a multiratio transmission having a plurality of ratios providing a series of ratios with each succeeding ratio having a successively lower numeric value of torque ratio and said series of ratios being divided into range groups each having a plurality of ratios to provide a plurality of ranges, a control mechanism having manual means settable to a plurality of range conditions and operative to condition said control mechanism for selecting any one of said plurality of ranges with a group consisting of a plurality of ratios establishable in each range, each of said groups having at least one ratio having a lower torque multiplication value than the ratios in another group, automatic means for automatically shifting to either one of the ratios of said group of ratios operative in the range conditioned for operation by said manual means and overcontrol means operative in response to operation of said manual means during a manual change of selection of range from one range to another range to select the ratio in said another range having a torque ratio value most nearly equal to the torque ratio value of the ratios in said one range regardless of the ratio selected by said automatic means.

32. In a transmission, a first multiratio gear unit having a plurality of ratios connecting an input member and an intermediate output member, second multiratio gear unit having a plurality of gear ratios connected to said intermediate output member and having an output member, a manual control operative to selectively engage each of said plurality of drive ratios of said second multiratio gear unit to provide a plurality of ranges, a governor controlled by the speed of one of said members, a control mechanism operatively connected to and responsive to said governor to control said first multiratio unit to provide an upshift from one ratio to another ratio with increasing speed at a predetermined speed and a downshift from said another to said one ratio with decreasing speed at a predetermined speed when said second multiratio unit is operating in each ratio corresponding to each of said plurality of ranges and means responsive to a change in ratio of said second gear unit to place said first multiratio unit in said another ratio or in said one ratio when said second gear unit is up or down-shifted respectively from one to another drive ratio to shift from one to another range.

33. In a transmission, a first multiple gear unit having a plurality of ratios connecting an input member and an intermediate output member, second multiratio gear unit having a plurality of ratios connected to said intermediate output member and having an output member, manual control means selectively operable to engage each of said plurality of drive ratios of said second multiratio gear unit to provide a plurality of ranges, a governor controlled by the speed of one of said output members, shift control means responsive to said governor controlling said first multiratio unit to provide with increasing speed a shift from either ratio to the other ratio at a different predetermined speed in each of said plurality of ratios of said second gear unit, signal means operatively responsive to the disengagement of one ratio when said second gear unit is shifted from said one drive ratio to another drive ratio to shift from one to another range providing a control signal, and means to momentarily hold said first multiratio unit in said another ratio or said one ratio operatively controlled by said signal means when said second gear unit is down or upshifted respectively from said one to another range regardless of the ratio selected by said shift control means.

34. The combination with a control system for a transmission adapted to be set to any one of a plurality of ratios of transmission having consecutively increasing ratio values of settable means settable by the driver and operative to condition said control system to any one of at least two ranges having a plurality of transmission ratios with a group of at least two ratios defining each range, each of said groups having at least one different ratio in the group, said system including means operative in each one of said ranges to automatically shift said transmission to either ratio of said group of at least two ratios which is operative in each range and overcontrol means operative in response to operation of said settable means by the driver to change the condition of said control system from one range to another range to overcontrol said shift means and to shift said transmission to the ratio in said another range having a value nearest the value of the ratios in said one range in which the transmission was operating prior to the change of range regardless of the ratio selected by said shift means.

35. The combination with a control system for a transmission adapted to be set to any one of a plurality of ratios of transmission having consecutively increasing ratio values of settable means settable by the driver and operative to condition said control system to any one of at least two ranges having a plurality of transmission ratios with at least two ratios defining each range and each of said ratios being operative in only one range, said system including shift means operative in each one of said ranges to automatically shift said transmission between said at least two ratios in each range and overcontrol means operative in response to operation of said settable means by the driver to change the condition of said control system from one range to another range to overcontrol said shift means and to shift said transmission to the ratio in said another range having a value nearest the values of the ratios in said one range in which the transmission was operating prior to the change of range regardless of the ratio selected by said shift means.

36. The combination with a control system for a transmission adapted to be set to any one of a plurality of ratios of transmission having consecutively increasing speed ratio values of settable means settable by the driver and operative to condition said control system to any one of at least two ranges having a plurality of transmission ratios with a group of at least two ratios defining each range, each of said groups in consecutively higher ranges having at least one different ratio having a higher ratio value in the group, said system including shift means operative in each one of said ranges to automatically shift said transmission into either ratios of each group during operation in each range in accordance with transmission speed, means responsive to operation of said settable means to change the condition of said control system from one to a higher range providing an upshift signal, and means responsive to operation of said settable means to change the condition of said control system from one to a lower range providing a downshift signal, and overcontrol means operative in response to said upshift and downshift signals during a change from one range to another range to overcontrol said shift means and to shift said transmission to the ratio in said another range having a value nearest the values of the ratios in said one range in which the transmission was operating prior to the change of range regardless of the ratio selected by said shift means.

37. In a transmission for an engine having a throttle pedal, an input member, an output member, transmission means connecting said input and output members providing a plurality of ratios, one servo motor to engage one ratio, another servo motor to engage another ratio, control valve means operative in one position to actuate one servo motor to engage one ratio and in another position to actuate another servo motor to engage another ratio, a governor driven by said output shaft providing a governor fluid having a pressure proportional to transmission speed, said governor fluid acting on said control valve means in both positions to provide a total governor force to urge said control valve means in one direction to said one position, means providing a throttle fluid having a pressure proportional to the throttle pedal position acting on said control means in both positions to provide a total throttle force to urge said control means in an opposite direction to said another position, and biasing means operative on said control valve means in both positions to provide a total biasing force in addition to said total governor and throttle forces during automatic shifting of said control valve means between said one position and said another position under the influence of said total governor force, said total throttle force and said total biasing force on said control valve means with said total biasing force acting in the same direction as said total governor force and opposing said total throttle force.

38. In a transmission for an engine having a throttle, an input member, an output member, transmission means connecting said input and output members providing a plurality of ratios, control means operative in one position to actuate said transmission means to engage one ratio and shiftable to another position to engage another ratio, governor means responsive to transmission speed acting on said control means to provide a total governor force to urge said control means in one direction to said one position, throttle means providing a force proportional to the throttle position acting on said control means in both positions to provide a total throttle force to urge said control means in the opposite direction to said another position, and biasing means operative on said control means to provide a total biasing force in addition to said total governor force and said total throttle force during automatic shifting from said one position to said another position under the influence of said total governor force, said total throttle force, and said total biasing force acting on said control means with said total biasing force acting in the same direction as said total governor force and both opposing said total throttle force.

39. In a transmission for an engine having a throttle; an input member; an output member; transmission means connecting said input and output members providing a plurality of ratios; control means operative in one position to actuate said transmission means to engage one ratio and shiftable to another position to engage another ratio; force means for providing three forces acting on said control means for an automatic speed and throttle responsive shifting in both positions of said control means consisting only of governor means providing a governor force corresponding to the transmission speed acting with increasing force with increasing speed on said control means to provide a total governor force to urge said control means in one direction toward said one position, and means providing a throttle force proportional to the throttle position acting on said control means to provide a total throttle force to urge said control means in the opposite direction to said another position, and biasing means acting on said control means during speed and throttle controlled shifting between said one and said another positions to provide a total biasing force in addition to said total governor force and said total throttle force acting on said control means urging said control means in said one direction toward said one position, and said governor means and said biasing means acting independently of each other on said control means against said throttle means to shift said control means from said one position to said another position at a predetermined high speed range.

40. The invention defined in claim 39 and said one ratio being a low speed ratio and said another ratio being a high speed ratio and said control means having means providing an additional hysteresis force operative only after said control means leaves said one position to urge said valve in said another position.

41. The invention defined in claim 39 and means holding said control means in said one position to establish said low ratio only at lower speeds below said high speed range until said total throttle force is effective to hold said control means in said one position against said total biasing and governor forces.

42. In combination, a multiratio transmission having a plurality of ratios operative in a plurality of ranges, a control mechanism for establishing said ratios having manual means settable to a plurality of ranges and operative to condition said control mechanism for operation in any one of said plurality of ranges with one range having at least one ratio and another range having a second and third ratio, a governor responsive to transmission speed, automatic means responsive to said governor for upshifting and downshifting during operation in said another range between either one of said second and third ratios and overcontrol means operative independent of transmission speed in response to said manual means for controlling said automatic means effective during a manual change of selection of range from said one range to said another range to select a predetermined ratio in said another range providing the smoothest shift from a ratio in said one range regardless of the ratio selected by said automatic means.

References Cited in the file of this patent
UNITED STATES PATENTS

| | | |
|---|---|---|
| 2,604,197 | Livermore | July 22, 1952 |
| 2,675,102 | Robinson | Apr. 13, 1954 |
| 2,697,363 | Sheppard | Dec. 21, 1954 |
| 2,720,124 | Polomski | Oct. 11, 1955 |
| 2,749,767 | Ebsworth | June 12, 1956 |
| 2,761,328 | Herndon et al. | Sept. 4, 1956 |
| 2,845,817 | Polomski | Aug. 5, 1958 |

UNITED STATES PATENT OFFICE

CERTIFICATE OF CORRECTION

Patent No. 3,096,666                                  July 9, 1963

Howard W. Christenson et al.

It is hereby certified that error appears in the above numbered patent requiring correction and that the said Letters Patent should read as corrected below.

Column 2, lines 46 and 47, after "circulating" insert -- fluid --; column 7, line 54, after "as" insert -- or --; column 11, line 21, for "203" read -- 293 --; line 46, for "and" read -- end --; column 22, line 67, after "second" insert -- control --.

Signed and sealed this 21st day of January 1964.

(SEAL)
Attest:
ERNEST W. SWIDER

EDWIN L. REYNOLDS

Attesting Officer                              Acting Commissioner of Patents